(12) United States Patent
Malladi et al.

(10) Patent No.: US 8,588,319 B2
(45) Date of Patent: Nov. 19, 2013

(54) MIMO TRANSMISSION WITH LAYER PERMUTATION IN A WIRELESS COMMUNICATION SYSTEM

(75) Inventors: Durga Prasad Malladi, San Diego, CA (US); Byoung-Hoon Kim, Seoul (KR); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 796 days.

(21) Appl. No.: 12/444,499

(22) PCT Filed: Nov. 6, 2007

(86) PCT No.: PCT/US2007/083739
§ 371 (c)(1),
(2), (4) Date: Apr. 6, 2009

(87) PCT Pub. No.: WO2008/058112
PCT Pub. Date: May 15, 2008

(65) Prior Publication Data
US 2010/0027697 A1 Feb. 4, 2010

Related U.S. Application Data

(60) Provisional application No. 60/864,581, filed on Nov. 6, 2006.

(51) Int. Cl.
*H04B 7/02* (2006.01)
*H04L 1/02* (2006.01)

(52) U.S. Cl.
USPC .......................................... 375/267; 375/299

(58) Field of Classification Search
USPC ........................... 375/260, 267, 299, 340, 347
See application file for complete search history.

(56) References Cited

U.S. PATENT DOCUMENTS 6,128,776 A   10/2000   Kang
7,630,886 B2  12/2009   Zhang et al.
(Continued)

FOREIGN PATENT DOCUMENTS

CN   1706133 A    12/2005
EP   0770990 A2   5/1997
(Continued)

OTHER PUBLICATIONS

International Search Report—PCT/US2007/083739, International Search Authority—European Patent Office, Oct. 16, 2008.

(Continued)

*Primary Examiner* — David B. Lugo
(74) *Attorney, Agent, or Firm* — Peng Zhu

(57) ABSTRACT

Techniques for supporting MIMO transmission with layer permutation are described. In one aspect, multiple codewords may be generated for transmission from multiple antennas (e.g., virtual antennas), with the number of codewords being less than the number of antennas. Each codeword may be mapped across the multiple antennas. Two codewords may be generated. For rank 3, the first codeword may be mapped to one layer (or one antenna on each subcarrier), and the second codeword may be mapped to two layers (or two antennas on each subcarrier). For rank 4, each codeword may be mapped to two layers. In another aspect, a base CQI indicative of an average signal quality may be determined. A delta CQI indicative of improvement over the average signal quality may also be determined. In yet another aspect, selection may be performed with different penalty factors for different ranks or number of codewords.

49 Claims, 13 Drawing Sheets

(56) References Cited

U.S. PATENT DOCUMENTS

| | | | |
|---|---|---|---|
| 8,126,487 B2* | 2/2012 | Lee et al. | 455/501 |
| 2002/0141353 A1* | 10/2002 | Ludwig et al. | 370/254 |
| 2005/0163243 A1* | 7/2005 | Chung et al. | 375/267 |
| 2005/0176436 A1* | 8/2005 | Mantravadi et al. | 455/450 |
| 2006/0155533 A1 | 7/2006 | Lin et al. | |
| 2006/0161432 A1 | 7/2006 | Zhang et al. | |
| 2006/0223449 A1 | 10/2006 | Sampath et al. | |
| 2008/0013610 A1* | 1/2008 | Varadarajan et al. | 375/221 |
| 2008/0144733 A1* | 6/2008 | ElGamal et al. | 375/267 |

FOREIGN PATENT DOCUMENTS

| | | |
|---|---|---|
| JP | 2005509359 | 4/2005 |
| KR | 20020030867 A | 4/2002 |
| KR | 20050091573 A | 9/2005 |
| RU | 2147392 C1 | 4/2000 |
| RU | 2233010 | 7/2004 |
| RU | 2237975 | 10/2004 |
| WO | WO03019819 | 3/2003 |
| WO | WO03041299 A1 | 5/2003 |
| WO | 2006018710 | 2/2006 |
| WO | WO2006099525 A1 | 9/2006 |
| WO | WO2006106762 A1 | 10/2006 |
| WO | WO2007024913 | 3/2007 |
| WO | WO2007024935 | 3/2007 |
| WO | WO2007040456 A2 | 4/2007 |

OTHER PUBLICATIONS

Written Opinion—PCT/US2007/083739, International Search Authority—European Patent Office, Oct. 16, 2008.

El Gamal, et al.: "Universal Space-Time Coding," IEEE Transactions on Information Theory, vol. 49, Issue 5, pp. 1097-1119, XP011074756, ISSN: 0018-9448, May 2003.

Kim, et al.: "WLC36-3: Selective Virtual Antenna Permutation for Layered OFDM-MIMO Transmission," IEEE Global Telecommunications Conference, 2006, Globecom '06, XP031075827, pp. 1-6, Nov. 2006.

Samanta, et al.: "Codebook Adaptation for Quantized MIMO Beamforming Systems," Conference Record of the Thirty-Ninth Asilomar Conference on Signals, Systems and Computers, 2005, pp. 376-380, XP010900022, ISBN: 978-1-4244-0131-4, Oct. 28-Nov. 1, 2005.

European Search Report—EP09169532—Search Authority—Berlin—Dec. 13, 2011.

European Search Report—EP10193732—Search Authority—Berlin—Dec. 15, 2011.

European Search Report—EP10193734—Search Authority—Berlin—Dec. 15, 2011.

Onizawa, et al., "Experimental Study of Eigenbeam MIMO-OFDM systems with Transmit Antenna Selection," Proceedings (Communication 1) of 2006 General Conference of The Institute of Electronics, Information and Communication Engineers, Japan, Mar. 8, 2006, p. 396, B-5-44.

Qualcomm Europe, "Analysis of Support Channel Overhead for DL MIMO", 3GPP TSG-RAN WG1#47 3GPP TSG-RAN WG1#47 R1-063439, <URL:http://www.3gpp.org/ftp/tsg_ran/WG1_RL1/TSGR1_47/Docs/R1-063439.zip>,Nov. 2, 2006.

Qualcomm Europe, "Further Link Analysis Comparing Layer Permutation with No Layer Permutation for 2x2", 3GPP TSG-RAN WG1#47 3GPP TSG-RAN WG1#47 R1-063435 <URL:http://www.3gpp.org/ftp/tsg_ran/WG1_RL1/TSGR1_47/Docs/R1-063435.zip>,Nov. 2, 2006.

Qualcomm Europe,"Further Link Analysis Comparing Layer Permutation with No Layer Permutation for 4x4", 3GPP TSG-RAN WG1#47 3GPP TSG-RAN WG1#47 R1-063436, <URL:http://www.3gpp.org/ftp/tsg_ran/WG1_RL1/TSGR1_47/Docs/R1-063436.zip>,Nov. 2, 2006.

Texas Instruments,"Signaling and Feedback Requirements for Different Number of Codewords", 3GPP TSG-RAN WG1#46bis R1-062646, <URL:http://www.3gpp.org/ftp/tsg_ran/WG1_RL1/TSGR1_46bis/Docs/R1-062646.zip>,Oct. 13, 2006.

* cited by examiner

MIMO TRANSMISSION WITH LAYER PERMUTATION IN A WIRELESS COMMUNICATION SYSTEM

The present application claims priority to provisional U.S. Application Ser. No. 60/864,581, entitled "METHOD AND APPARATUS FOR EFFICIENT OPERATIONS OF LAYER PERMUTATION IN MIMO WIRELESS COMMUNICATION SYSTEMS," filed Nov. 6, 2006, assigned to the assignee hereof and incorporated herein by reference.

BACKGROUND

I. Field

The present disclosure relates generally to communication, and more specifically to techniques for transmitting data in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may support multiple-input multiple-output (MIMO) transmission. For MIMO, a transmitter station may utilize multiple (T) transmit antennas for data transmission to a receiver station equipped with multiple (R) receive antennas. The multiple transmit and receive antennas form a MIMO channel that may be used to increase throughput and/or improve reliability. For example, the transmitter station may transmit up to T data streams simultaneously from the T transmit antennas to improve throughput. Alternatively, the transmitter station may transmit a single data stream from all T transmit antennas to improve reliability. In any case, it is desirable to send a MIMO transmission in a manner to achieve good performance and to reduce the amount of feedback information to support the MIMO transmission.

SUMMARY

Techniques for supporting MIMO transmission with layer permutation are described herein. With layer permutation, a codeword may be mapped across all antennas used for a MIMO transmission and may then observe an average signal-to-noise-and-interference ratio (SINR) for all antennas. In general, an antenna may be a virtual antenna formed with a precoding matrix, a physical antenna, an antenna array, etc. The number of antennas used for the MIMO transmission may be referred to as rank.

In one aspect, multiple codewords may be generated for transmission from multiple antennas for a MIMO transmission, with the number of codewords being less than the number of antennas. Each codeword may be mapped across the multiple antennas, e.g., uniformly such that an equal portion of the codeword is mapped to each antenna. For example, each codeword may be mapped cyclically across the multiple antennas on multiple subcarriers. In one design, two codewords may be generated. For rank 3, the first codeword may be mapped to one antenna on each subcarrier, and the second codeword may be mapped to two antennas on each subcarrier. For rank 4, each codeword may be mapped to two antennas on each subcarrier. In one design, each codeword may be mapped to at least one of multiple layers. The multiple layers may then be mapped to the multiple antennas. For example, each layer may be mapped cyclically across the multiple antennas on multiple subcarriers.

In another aspect, a base channel quality indicator (CQI) indicative of an average signal quality (e.g., an average SINR) for multiple antennas used for a MIMO transmission may be determined. A delta CQI indicative of improvement over the average signal quality for the MIMO transmission may also be determined. For a UE capable of performing successive interference cancellation (SIC), the delta CQI may indicate the signal quality improvement for a second codeword after cancellation of interference from a first codeword. For a UE not capable of performing SIC, and also for a SIC-capable UE when rank is 1 or only one codeword is sent, the delta CQI may be set to a null value, or the amount of feedback may be reduced, or precoding and/or other information may be sent using the bits normally used for the delta CQI.

In yet another aspect, transmission order selection may be performed with different penalty factors for different transmission orders. Each transmission order may correspond to a different rank or a different number of codewords for a MIMO transmission. Performance metric values for multiple transmission orders may be determined using a penalty factor for each transmission order. Higher transmission orders may be associated with larger penalty factors, which may then favor selection of a lower transmission order having potentially less implementation losses. A transmission order for the MIMO transmission may be selected based on the performance metric values for the multiple transmission orders. In one design, each transmission order corresponds to a different rank, and performance metric values may be determined for multiple hypotheses for the multiple ranks, with each hypothesis corresponding to a different set of at least one antenna. The rank and the set of at least one antenna corresponding to the hypothesis with the largest performance metric value may be selected for use for the MIMO transmission.

Various aspects and features of the disclosure are described in further detail below.

BRIEF DESCRIPTION OF THE DRAWINGS

FIGS. 5A and 5B show transmissions without and with layer permutation.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA, E-UTRA and GSM are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, GSM, UMTS and LTE are described in documents from an organization named "3rd Generation Partnership Project" (3GPP). cdma2000 and UMB are described in documents from an organization named "3rd Generation Partnership Project 2" (3GPP2). These various radio technologies and standards are known in the art.

Figure 1:
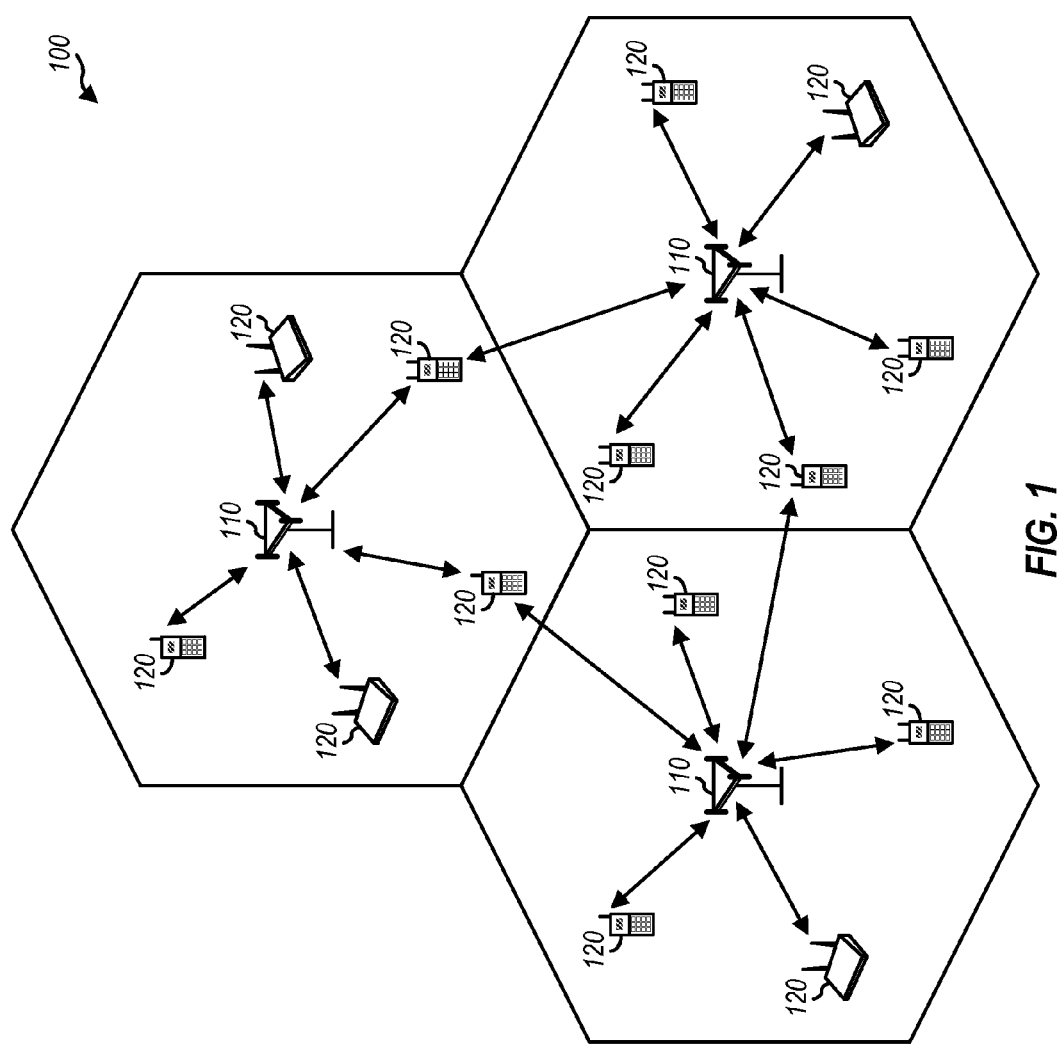
FIG. 1 shows a wireless multiple-access communication system.

FIG. 1 shows a wireless multiple-access communication system 100 with multiple Node Bs 110. A Node B may be a fixed station used for communicating with the UEs and may also be referred to as an evolved Node B (eNB), a base station, an access point, etc. Each Node B 110 provides communication coverage for a particular geographic area. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmission on the downlink and uplink. The downlink (or forward link) refers to the communication link from the Node Bs to the UEs, and the uplink (or reverse link) refers to the communication link from the UEs to the Node Bs.

The techniques described herein may be used for MIMO transmission on the downlink as well as the uplink. For clarity, much of the description below is for MIMO transmission on the downlink.

Figure 2:
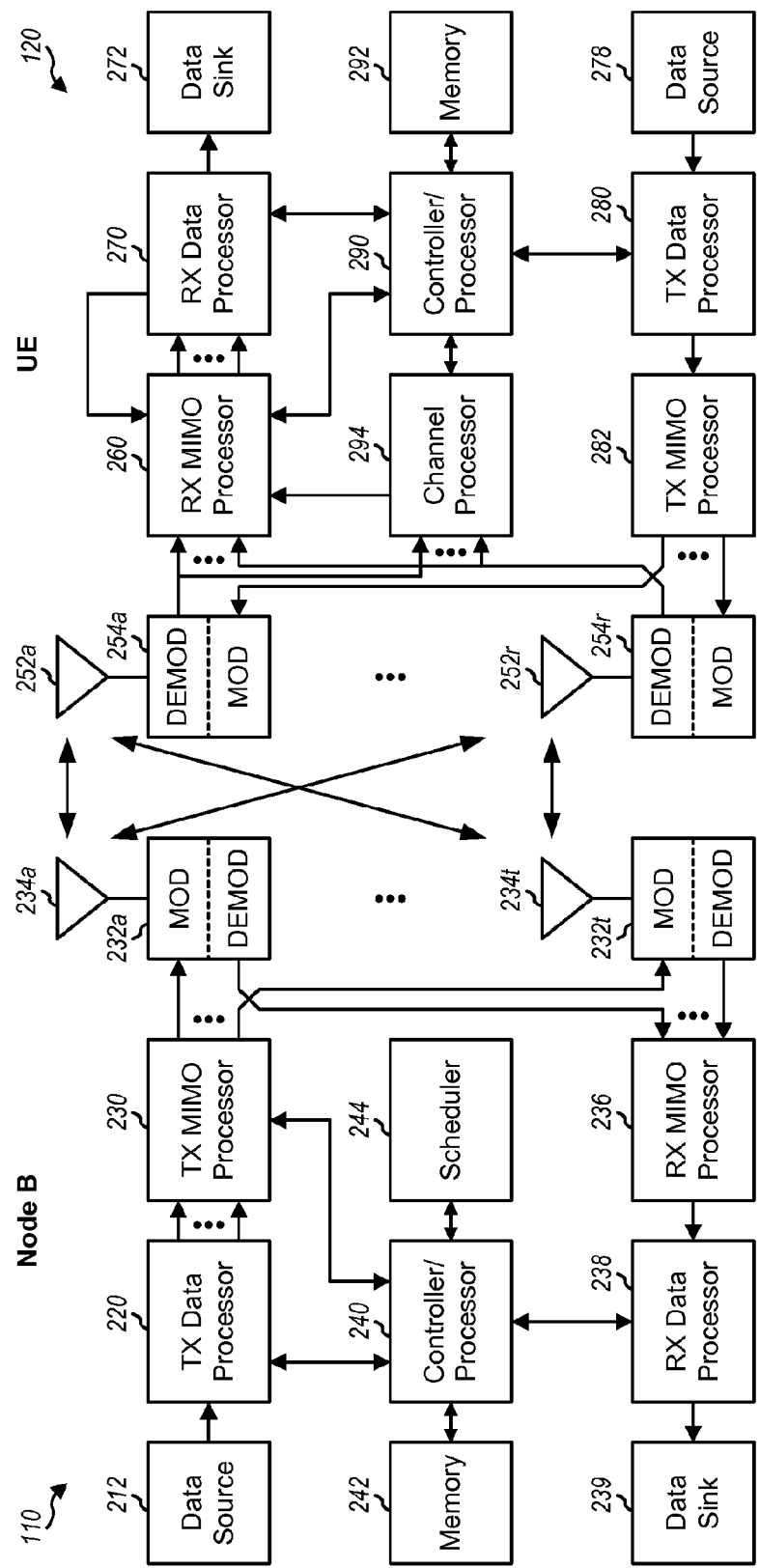
FIG. 2 shows a block diagram of a Node B and a UE.

FIG. 2 shows a block diagram of a design of a Node B 110 and a UE 120, which are one of the Node Bs and one of the UEs in FIG. 1. Node B 110 is equipped with multiple (T) antennas 234a through 234t. UE 120 is equipped with multiple (R) antennas 252a through 252r. Each of antennas 234 and 254 may be a physical antenna or an antenna array.

At Node B 110, a TX data processor 220 may receive data from a data source 212, process (e.g., encode and symbol map) the data based on one or more modulation and coding schemes, and provide data symbols. As used herein, a data symbol is a symbol for data, a pilot symbol is a symbol for pilot, and a symbol is typically a complex value. The data and pilot symbols may be modulation symbols from a modulation scheme such as PSK or QAM. Pilot is data that is known a priori by both the Node B and UE. A TX MIMO processor 230 may perform spatial processing on the data and pilot symbols based on direct MIMO mapping or preceding/beamforming, as described below. TX MIMO processor 230 may provide T output symbol streams to T modulators (MOD) 232a through 232t. Each modulator 232 may process its output symbol stream (e.g., for orthogonal frequency division multiplexing (OFDM), etc.) to obtain an output chip stream. Each modulator 232 may further condition (e.g., convert to analog, filter, amplify, and upconvert) its output chip stream and generate a downlink signal. T downlink signals from modulators 232a through 232t may be transmitted via antennas 234a through 234t, respectively.

At UE 120, R antennas 252a through 252r may receive the T downlink signals, and each antenna 252 may provide a received signal to an associated demodulator (DEMOD) 254. Each demodulator 254 may condition (e.g., filter, amplify, downconvert, and digitize) its received signal to obtain samples and may further process the samples (e.g., for OFDM, etc.) to obtain received symbols. Each demodulator 254 may provide received data symbols to an RX MIMO processor 260 and provide received pilot symbols to a channel processor 294. Channel processor 294 may estimate the response of the wireless channel from Node B 110 to UE 120 based on the received pilot symbols and provide channel estimates to RX MIMO processor 260. RX MIMO processor 260 may perform MIMO detection on the received data symbols with the channel estimates and provide detected symbols, which are estimates of the transmitted data symbols. An RX data processor 270 may process (e.g., symbol demap and decode) the detected symbols and provide decoded data to a data sink 272.

UE 120 may evaluate the channel conditions and determine channel state information, which may comprise various types of information as described below. The channel state information and data from a data source 278 may be processed (e.g., encoded and symbol mapped) by a TX data processor 280, spatially processed by a TX MIMO processor 282, and further processed by modulators 254a through 254r to generate R uplink signals, which may be transmitted via antennas 252a through 252r. At Node B 110, the R uplink signals from UE 120 may be received by antennas 234a through 234t, processed by demodulators 232a through 232t, spatially processed by an RX MIMO processor 236, and further processed (e.g., symbol demapped and decoded) by an RX data processor 238 to recover the channel state information and data sent by UE 120. The recovered data may be provided to a data sink 239, and the recovered channel state information may be provided to a controller/processor 240. Controller/processor 240 may control data transmission to/from UE 120 based on the received channel state information.

Controllers/processors 240 and 290 may direct the operation at Node B 110 and UE 120, respectively. Memories 242 and 292 may store data and program codes for Node B 110 and UE 120, respectively. A scheduler 244 may select UE 120 and/or other UEs for data transmission on the downlink and/or uplink based on channel state information received from all of the UEs.

Node B 110 may transmit one or more data symbols simultaneously from the T transmit antennas on each subcarrier in each symbol period. Multiple (K) subcarriers may be available for transmission and may be obtained with OFDM or single-carrier frequency division multiplexing (SC-FDM). Node B 110 may transmit the data symbols using various transmission schemes.

In one design, Node B 110 may process the data symbols for each subcarrier k as follows:

$$\underline{x}(k) = \underline{U}\underline{P}(k)\underline{s}(k), \qquad \text{Eq (1)}$$

where $\underline{s}(k)=[s_1(k)\ s_2(k)\ \ldots\ s_M(k)]^T$ is an M×1 vector containing $\overline{M}$ data symbols to be sent on M layers on subcarrier k in one symbol period, P(k) is a T×M layer permutation matrix for subcarrier k,
$\underline{U}=[\underline{u}_1\ \underline{u}_2\ \ldots\ \underline{u}_T]$ is a T×T preceding matrix, $\underline{x}(k)=[x_1(k)\ x_2(k)\ \ldots\ x_T(k)]^T$ is a T×1 vector containing T output symbols for the T transmit antennas on subcarrier k in one symbol period, and "$^T$" denotes a transpose.

Equation (1) is for one subcarrier k. The same processing may be performed for each subcarrier used for transmission.

The precoding matrix U is used to form T virtual antennas with the T transmit antennas. Each virtual antenna is formed with one column of U. A data symbol may be multiplied by one column of U and may then be sent on one virtual antenna and all T transmit antennas. U may be a discrete Fourier transform (DFT) matrix or some other orthonormal matrix having orthogonal columns and unit power for each column. U may also be selected from a set of precoding matrices.

The layer permutation matrix P(k) maps the M layers to M virtual antennas, which may be selected from T available virtual antennas. P(k) may be defined based on the layer to virtual antenna mapping selected for use, as described below. In general, the same or different permutation matrices may be used for the K subcarriers.

For the design shown in equation (1), Node B 110 may appear to have T virtual antennas rather than T physical antennas. The T virtual antennas may be associated with different SINRs. Rank selection may be performed to determine M best virtual antennas to use for data transmission, where in general 1≤M≤T.

Figure 3:
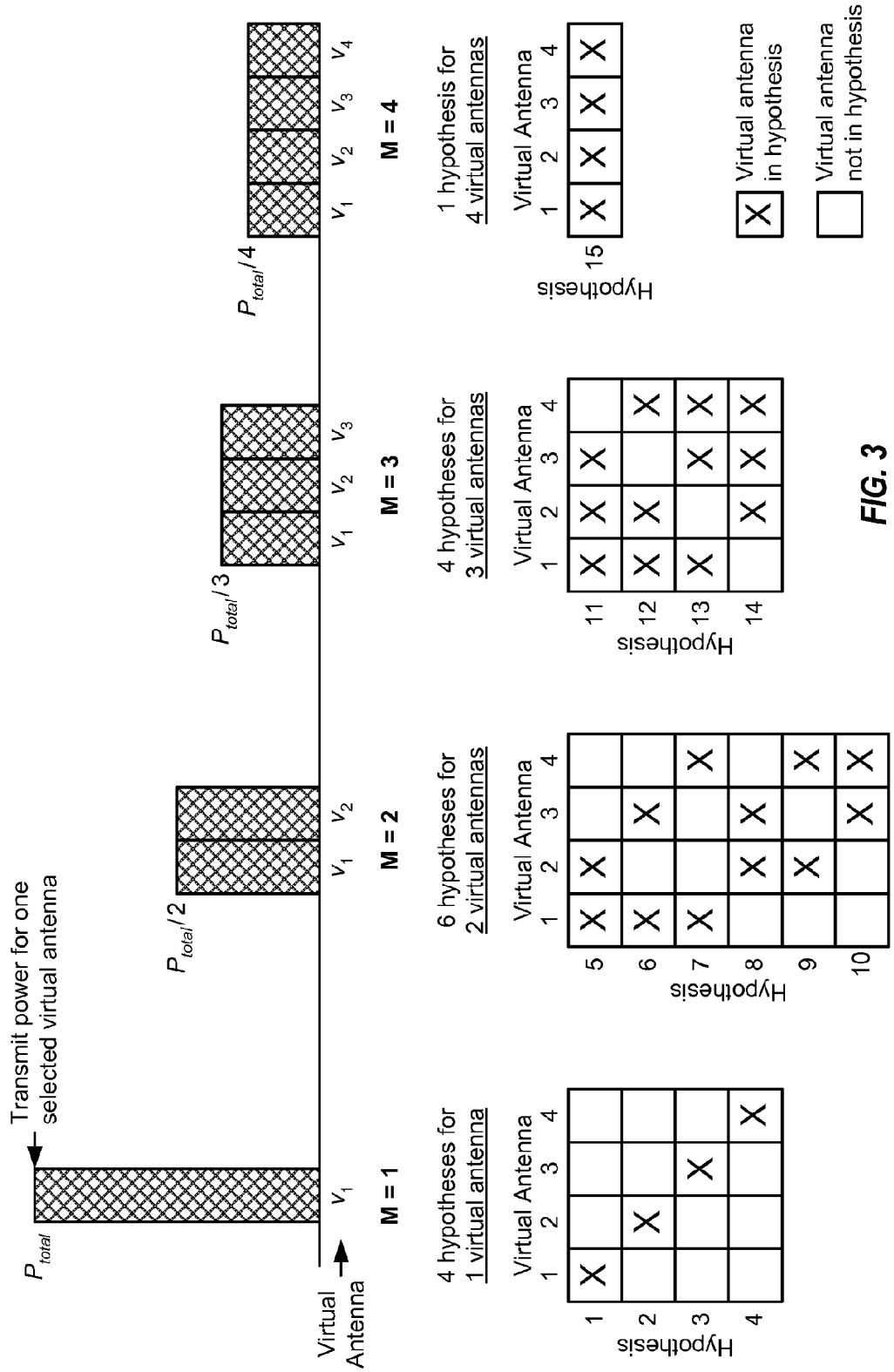
FIG. 3 shows rank selection with four virtual antennas.

FIG. 3 shows a design of rank selection to determine M best virtual antennas $v_1$ through $v_M$ to use for data transmission. In the example shown in FIG. 3, T=4, and four virtual antennas are available. A total of 15 hypotheses may be evaluated, with four hypotheses 1 through 4 being for one virtual antenna, six hypotheses 5 through 10 being for two virtual antennas, four hypotheses 11 through 14 being for three virtual antennas, and one hypothesis 15 being for four virtual antennas. The set of virtual antenna(s) for each hypothesis is shown in FIG. 3. For example, hypothesis 2 is for one virtual antenna 2 ($v_1$=2), hypothesis 6 is for two virtual antennas 1 and 3 ($v_1$=1 and $v_2$=3), etc.

The performance of each hypothesis may be determined by first distributing the total transmit power $P_{total}$ evenly across all virtual antennas for that hypothesis. Performance may be quantified by a metric such as average SINR, total capacity, overall throughput, etc. A metric value may be determined for each of the 15 hypotheses. The hypothesis with the largest metric value may be identified, and the set of virtual antenna(s) for this hypothesis may be selected for use.

In general, rank selection may be dependent on the precoding matrices available for use and the manner in which the precoding matrices may be used. For example, a set of precoding matrices may be available for use, and any one or more columns in a given precoding matrix may be selected for use. In this case, metric values may be determined for all hypotheses for each precoding matrix. The precoding matrix and the set of virtual antenna(s) with the largest metric value may then be selected for use. As another example, a set of precoding matrices with different number of columns may be available for use, and one precoding matrix may be selected for use. In this case, there is one hypothesis for each precoding matrix, a metric value may be determined for each precoding matrix, and the precoding matrix with the largest metric value may be selected for use. In general, any number of precoding matrices may be available for use, and each precoding matrix may have any number of hypotheses. In any case, the number of selected virtual antennas is referred to as the rank of the MIMO transmission.

The rank of the MIMO transmission may be selected based on the hypothesis with the largest metric value, e.g., the highest total capacity. The metric value for each hypothesis may be computed based on an assumption that data can be sent independently from each virtual antenna. However, in a practical system, a higher rank may be associated with greater implementation losses than a lower rank. For example, multiple codewords may be sent in parallel with Hybrid Automatic Repeat Request (HARQ) for rank 2 or higher, different numbers of retransmissions may be used for these codewords, and there may be gaps in transmission on one or more layers while waiting for the last codeword to be completed so that the next set of codewords can be sent aligned in time. As another example, MIMO detection for a higher rank may be more prone to losses due to inaccurate channel estimates.

In an aspect, rank selection may be performed in a manner to account for rank-dependent implementation losses. A higher rank may be associated with larger implementation losses, e.g., due to the reasons noted above. Hence, penalty factors that are proportional to rank may be used for rank selection, with progressively larger penalty factors being used for progressively higher ranks to calculate the metric values. The penalty factors may be selected to favor lower ranks, which may be associated with less implementation losses and possibly less signaling overhead. When two ranks have similar metric values, the penalty factors may result in the higher rank being selected only if the difference between the metric values for these two ranks would more than compensate for the expected greater implementation losses of the higher rank. The expected implementation losses for each rank may be estimated via computer simulation, empirical measurements, etc. The penalty factor for each rank may then be set based on the expected implementation losses for that rank. In one design, different penalty factors may be independently selected for different ranks. In another design, the penalty factors for different ranks may linearly increase by a predetermined offset $PF_{OS}$ and may be computed as $PF_{Rm}=(m-1)\cdot PF_{OS}$, where $PF_{Rm}$ is the penalty factor for rank m. In general, the penalty factors for different ranks may be given as $PF_{R1} \leq PF_{R2} \leq \ldots \leq PF_{RM}$. In both designs, the penalty factors for different ranks may be static values or may be dynamic values that may vary based on channel conditions and/or other factors.

Figure 4:
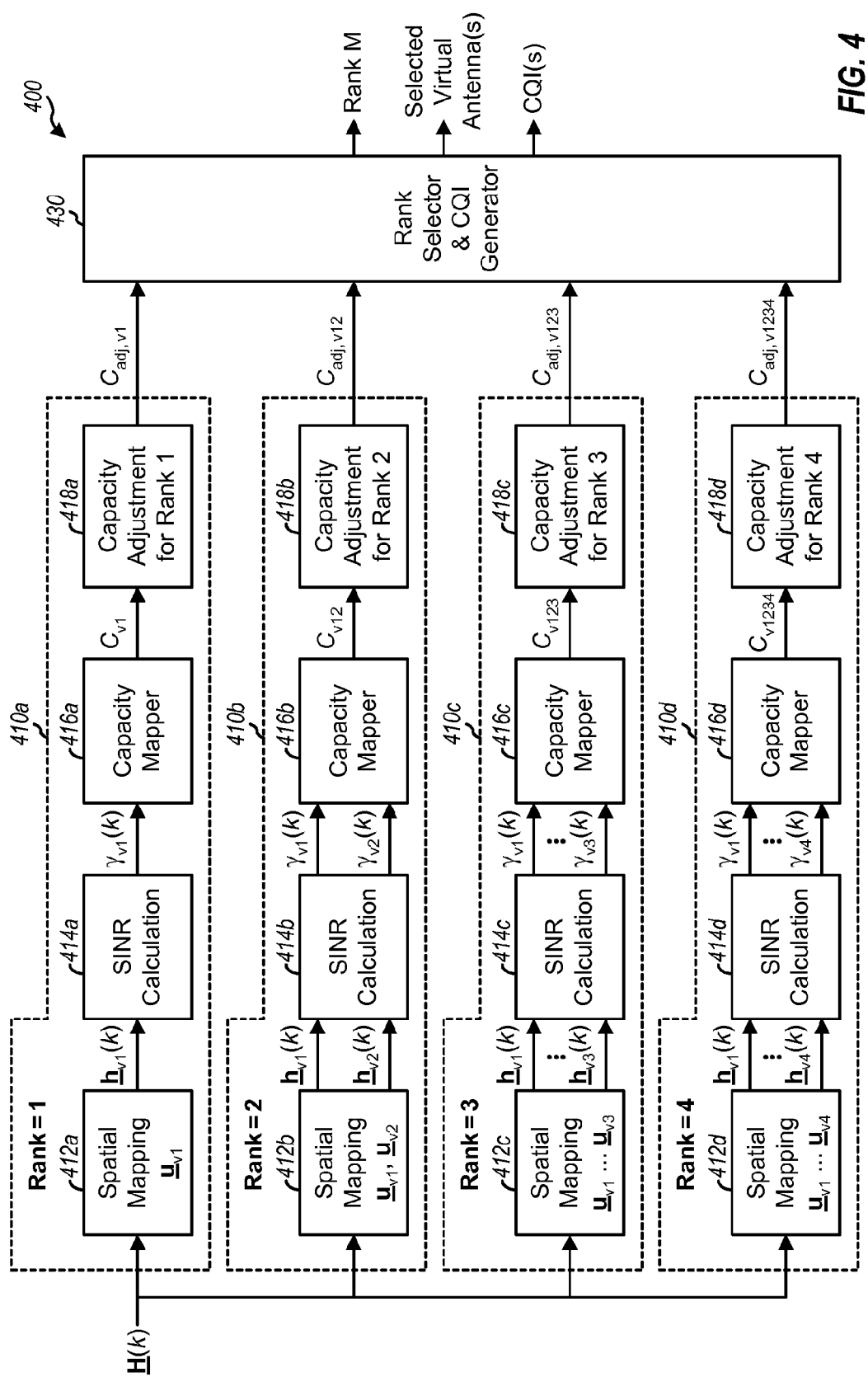
FIG. 4 shows a rank selector.

FIG. 4 shows a block diagram of a design of a rank selector 400 that selects M best virtual antennas based on a maximum sum-capacity criterion. Rank selector 400 may be implemented by processor 290 at UE 120 or processor 240 at Node B 110 in FIG. 2. Rank selector 400 includes four processing sections 410a through 410d for ranks 1 through 4, respectively. Section 410a provides four total capacity values for four hypotheses for rank 1, section 410b provides six total capacity values for six hypotheses for rank 2, section 410c provides four total capacity values for four hypotheses for rank 3, and section 410d provides one total capacity value for one hypothesis for rank 4.

Within processing section 410a for rank 1, a spatial mapping unit 412a may receive a MIMO channel response matrix H(k) for each subcarrier k and determine an effective MIMO channel response vector $h_{v1}(k)$ as follows: $\underline{h}_{v1}(k)=\underline{H}(k)\cdot\underline{u}_{v1}$, where $\underline{u}_{v1}$ is a column of the precoding matrix $\underline{U}$ for virtual antenna $v_1$, with $v_1$ being dependent on the hypothesis being evaluated. An SINR calculation unit 414a may determine an SINR $\gamma_{v1}(k)$ of each subcarrier k for virtual antenna $v_1$ based on $h_{v1}(k)$, the MIMO detection technique used by UE 120, and the transmit power allocated to subcarrier k of virtual antenna $v_1$. A capacity mapper 416a may map the SINR $\gamma_{v1}(k)$ to capacity based on an unconstrained capacity function or a constrained capacity function. Unit 416a may accumulate the capacities of all K subcarriers for virtual antenna $v_1$ and provide the total capacity $C_{v1}$ for virtual antenna $v_1$. The total capacity may also be determined in other manners. For example, the SINR may be averaged over all subcarriers, and the average SNR may be mapped to capacity. In any case, a unit 418a may adjust the total capacity for virtual antenna $v_1$ based on a penalty factor $PF_{R1}$ for rank 1 and provide an adjusted capacity $C_{adj,v1}$ for virtual antenna $v_1$. The processing may be repeated for each of the four hypotheses for $v_1=1, 2, 3, 4$ corresponding to virtual antenna 1, 2, 3 or 4, respectively, being selected.

Processing section 410b for rank 2 may determine the total capacity $C_{v12}$ for each of the six hypotheses with two virtual antennas. A unit 418b may adjust the total capacity for each hypothesis based on a penalty factor $PF_{R2}$ for rank 2. Processing section 410c for rank 3 may determine the total capacity $C_{v123}$ for each of the four hypotheses with three virtual antennas. A unit 418c may adjust the total capacity for each hypothesis based on a penalty factor $PF_{R3}$ for rank 3. Processing section 410d for rank 4 may determine the total capacity $C_{v1234}$ for the hypothesis with four virtual antennas. A unit 418d may adjust the total capacity for this hypothesis based on a penalty factor $PF_{R4}$ for rank 4.

A rank selector & CQI generator 430 may receive the adjusted capacity for each of the 15 hypotheses for ranks 1 through 4. Unit 430 may select the hypothesis with the largest adjusted capacity and may provide the rank and the virtual antenna(s) corresponding to the selected hypothesis. For T=4, there are 15 total hypotheses, and the selected rank and the selected virtual antenna(s) may both be conveyed by a 4-bit index of the selected hypothesis. Unit 430 may also determine one or more CQIs based on the SINRs for the selected virtual antenna(s). In general, a CQI may be generated for one or more antennas, one or more codewords, etc. A CQI may comprise an average SINR, a modulation and coding scheme (MCS), a packet format, a transport format, a rate and/or some other information indicative of signal quality or transmission capacity. Rank and antenna selection may also be performed in other manners.

In another design, different penalty factors may be used for different numbers of codewords (instead rank). For HARQ, the blanking loss may be due to different numbers of retransmissions for different codewords and may thus be related to the number of codewords (instead of the number of layers). The penalty factors for different numbers of codewords may be given as $PF_{C1} < PF_{C2} \leq \ldots \leq PF_{CL}$, where $PF_{Cl}$ is the penalty factor for l codewords. In general, the penalty factor may be parameterized as a function of rank, the number of codewords, some other parameter, or any combination of parameters.

UE 120 may send the selected precoding matrix (if multiple precoding matrices are available for use) and the M selected virtual antennas to Node B 110. Node B 110 may use all or a subset of the M selected virtual antennas for data transmission to UE 120.

Node B 110 may send L codewords using the M selected virtual antennas, where in general $1 \leq L \leq M$. A codeword may be obtained by encoding a data block at a transmitter station and may be decoded separately by a receiver station. A data block may also be referred to as a code block, a transport block, a packet, a protocol data unit (PDU), etc. A codeword may also be referred to as an encoded block, a coded packet, etc. L data blocks may be encoded separately to obtain L codewords. There is a one-to-one mapping between data block and codeword. Node B 110 may send each codeword via one or more selected virtual antennas.

Figures 5A, 5B:
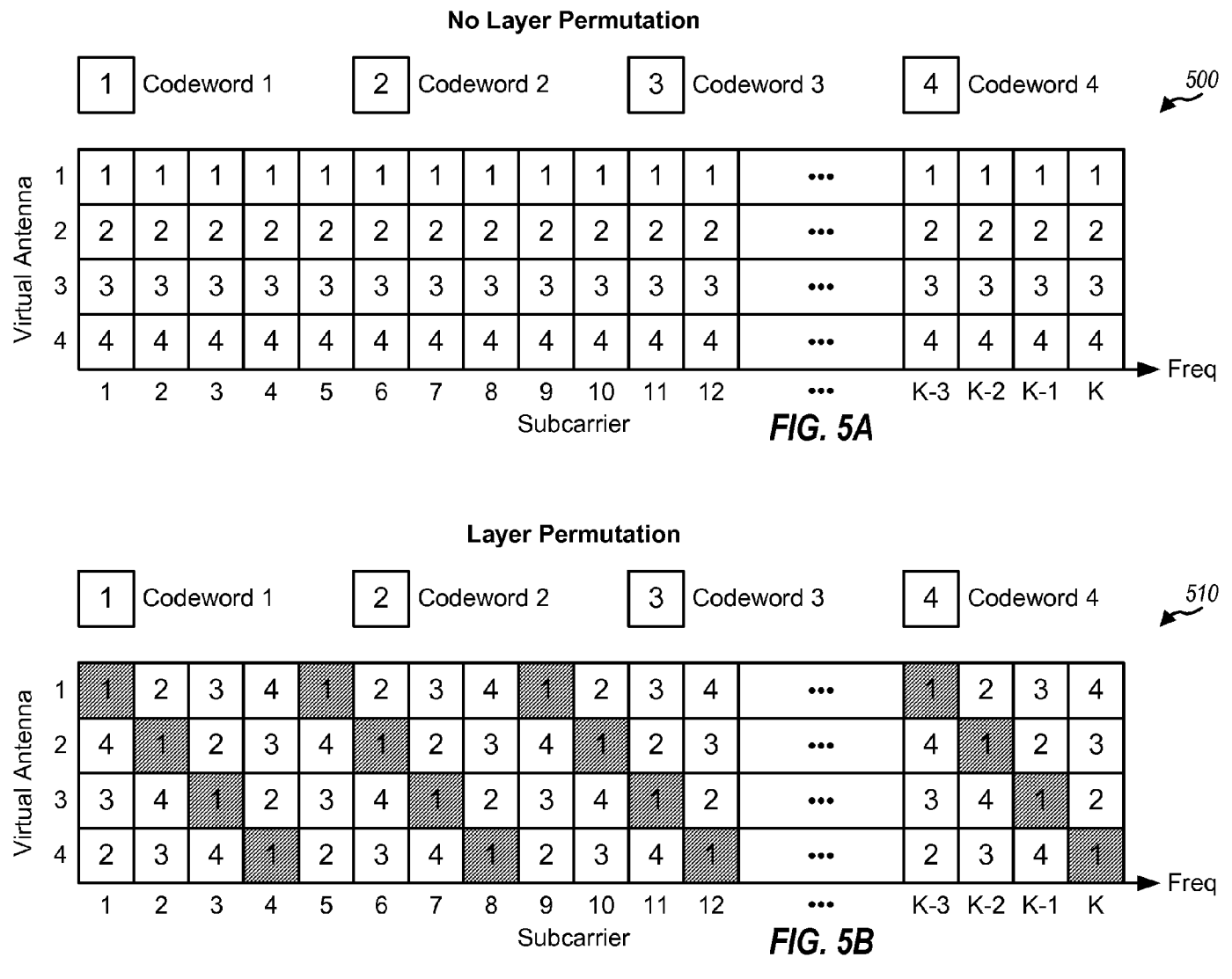

FIG. 5A shows a design of transmitting L=4 codewords from M=4 virtual antennas without layer permutation, which may also be referred to as selective per virtual antenna rate control (S-PVARC). In this design, codewords 1, 2, 3 and 4 are sent from virtual antennas 1, 2, 3 and 4, respectively, one codeword from each virtual antenna. The M virtual antennas may have different SINRs. A suitable MCS may be selected for each codeword based on the SINR of the virtual antenna used for that codeword. Each codeword may be sent based on the MCS selected for that codeword.

FIG. 5B shows a design of transmitting L=4 codewords from M=4 virtual antennas with layer permutation, which is also referred to as selective virtual antenna permutation (S-VAP). In this design, each codeword may be sent from all four virtual antennas based on a mapping pattern that maps codewords to subcarriers and virtual antennas. In the design shown in FIG. 5A, each codeword cycles through the four virtual antennas across the K subcarriers. Thus, codeword 1 is sent from virtual antenna 1 on subcarriers 1, 5, and so on, from virtual antenna 2 on subcarriers 2, 6, and so on, from virtual antenna 3 on subcarriers 3, 7, and so on, and from virtual antenna 4 on subcarriers 4, 8, and so on. Each remaining codeword also cycles through the four virtual antennas across the K subcarriers, as shown in FIG. 5B. Each codeword is sent across all M selected virtual antennas with layer permutation and may thus observe the average SINR of the M selected virtual antennas. A suitable MCS may be selected based on the average SINR and used for each codeword.

A layer may be defined as comprising one spatial dimension for each subcarrier used for transmission. A layer may also be referred to as a transmission layer, etc. M spatial dimensions may be available for each subcarrier with M selected virtual antennas. With no layer permutation in FIG. 5A, M layers may be available, and each layer may be mapped to a different virtual antenna. With layer permutation in FIG. 5B, M layers may be available, and each layer may be mapped across all M virtual antennas. In general, each layer may be mapped to subcarriers and virtual antennas based on any mapping, two examples of which are shown in FIGS. 5A and 5B.

UE 120 may perform MIMO detection on R received symbol streams from R demodulators 254a through 254r to obtain M detected symbol streams, which are estimates of the M data symbol streams sent via the M selected virtual antennas. The MIMO detection may be based on minimum mean square error (MMSE), zero-forcing (ZF), maximal ratio combining (MRC), maximum likelihood (ML) detection, sphere detection/decoding, or some other technique. UE 120 may process the M data symbol streams to obtain L decoded data blocks for the L codewords sent by Node B 110.

UE 120 may also perform MIMO detection with SIC. In this case, UE 120 may perform MIMO detection, then process the detected symbol streams to recover one codeword, then estimate and cancel the interference due to the recovered codeword, and then repeat the same processing for the next codeword. Each codeword that is recovered later may experience less interference and hence observe higher SINR. For SIC, the L codewords may achieve different SINRs. The SINR of each codeword may be dependent on (i) the SINR of that codeword with linear MIMO detection, (ii) the particular stage in which the codeword is recovered, and (iii) the interference due to codewords (if any) recovered later.

UE 120 may send channel state information to assist Node B 110 with data transmission to the UE. The channel state information may comprise the selected preceding matrix and the M selected virtual antennas. The channel state information may also comprise one or more CQIs for the M selected virtual antennas. For no layer permutation shown in FIG. 5A, UE 120 may send a CQI for each of the M selected virtual antennas. If UE 120 supports SIC, then the M CQIs for the M selected virtual antennas may reflect the SINR improvement due to SIC. For layer permutation shown in FIG. 5B, UE 120 may send an average CQI for all M selected virtual antennas. If UE 120 supports SIC, then UE 120 may also send a delta CQI for each virtual antenna after the first virtual antenna. The delta CQI for each virtual antenna may indicate the SINR improvement due to the use of SIC for that virtual antenna. Alternatively, UE 120 may send a single delta CQI that may indicate the average SINR improvement due to SIC for each virtual antenna. A delta CQI may also be referred to as a differential CQI, a spatially differential CQI, an incremental CQI, etc. In any case, sending a CQI for each selected virtual antenna may result in relatively high feedback overhead.

In an aspect, either one or two codewords may be sent via one or more virtual antennas using layer permutation. Table 1 gives a description on how one or two codewords may be sent for rank 1, 2, 3 and 4 in accordance with one design. The number of layers is equal to the rank.

TABLE 1

| Rank | Number of Codewords | Description |
|------|---------------------|-------------|
| 1 | 1 | Send one codeword via best virtual antenna, e.g., 1, 2, 3 or 4. |
| 2 | 2 | Send two codewords via best pair of virtual antennas, one codeword on each layer. |
| 3 | 2 | Send two codewords via three best virtual antennas, one codeword on one layer and another codeword on two layers. |
| 4 | 2 | Send two codewords via four virtual antennas, each codeword on two layers. |

Figure 6A:
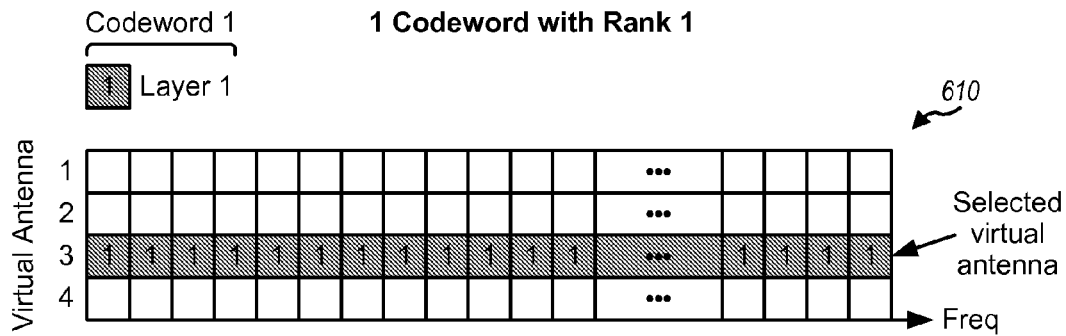
FIGS. 6A to 6F show transmissions of 1 or 2 codewords with different ranks.

FIG. 6A shows a transmission 610 of one codeword for rank 1. The best virtual antenna may be selected for use from among four available virtual antennas 1, 2 3 and 4. One layer is available and is mapped to the selected virtual antenna, which is virtual antenna 3 in the example shown in FIG. 6A. One codeword is sent on one layer and via one selected virtual antenna.

Figure 6B:
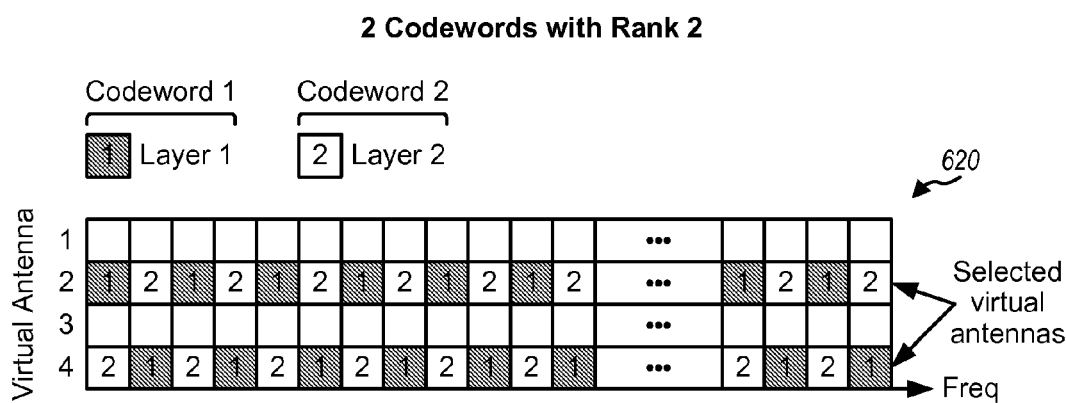

FIG. 6B shows a transmission 620 of two codewords for rank 2. The best pair of virtual antennas {1, 2}, {1, 3}, {1, 4}, {2, 3}, {2, 4} or {3, 4} may be selected for use from among four available virtual antennas. In the example shown in FIG. 6B, virtual antennas 2 and 4 are the selected virtual antennas. Two layers are available and may be mapped to the two selected virtual antennas with layer permutation. Codeword 1 may be sent on layer 1, which is shown with shading in FIG. 6B. Codeword 2 may be sent on layer 2, which is shown without shading in FIG. 6B.

Figure 6C:
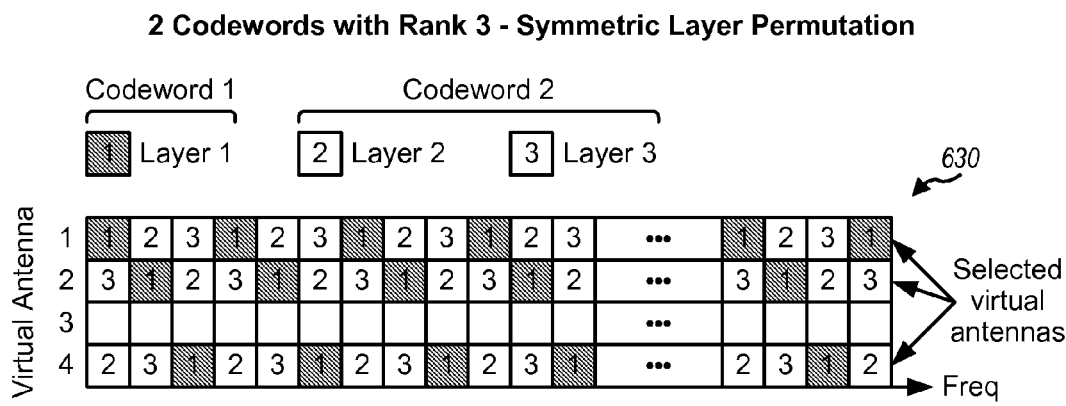

FIG. 6C shows a transmission 630 of two codewords for rank 3 with symmetric layer permutation. A set of three best virtual antennas {1, 2, 3}, {1, 2, 4}, {1, 3, 4} or {2, 3, 4} may be selected for use from among four available virtual antennas. In the example shown in FIG. 6C, virtual antennas 1, 2 and 4 are the selected virtual antennas. Three layers are available and may be mapped to the three selected virtual antennas with layer permutation. In the example shown in FIG. 6C, the layer permutation is symmetric, and each layer is mapped to all three selected virtual antennas in a cyclic manner. Codeword 1 may be sent on layer 1, which is shown with shading in FIG. 6C. Codeword 2 may be sent on layers 2 and 3, which are shown without shading in FIG. 6C. Since codeword 2 is sent on two layers whereas codeword 1 is sent on one layer, codeword 2 may have a larger size than codeword 1.

Figure 6D:
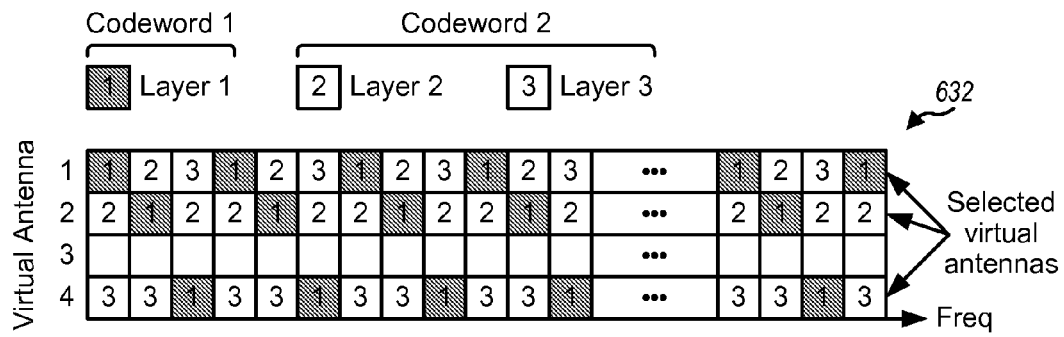

FIG. 6D shows a transmission 632 of two codewords for rank 3 with asymmetric layer permutation. In the example shown in FIG. 6D, layer 1 is mapped across all three selected virtual antennas, layer 2 is mapped to virtual antennas 1 and 2, and layer 3 is mapped to virtual antennas 1 and 4. Codeword 1 may be sent on layer 1, which is shown with shading in FIG. 6D. Codeword 1 may be sent across all three selected virtual antennas because layer 1 is mapped to all three virtual antennas. Codeword 2 may be sent on layers 2 and 3, which are shown without shading in FIG. 6D. Codeword 2 may be sent across all three selected virtual antennas even though layers 2 and 3 are each mapped to only two of the three selected virtual antennas.

Figure 6E:
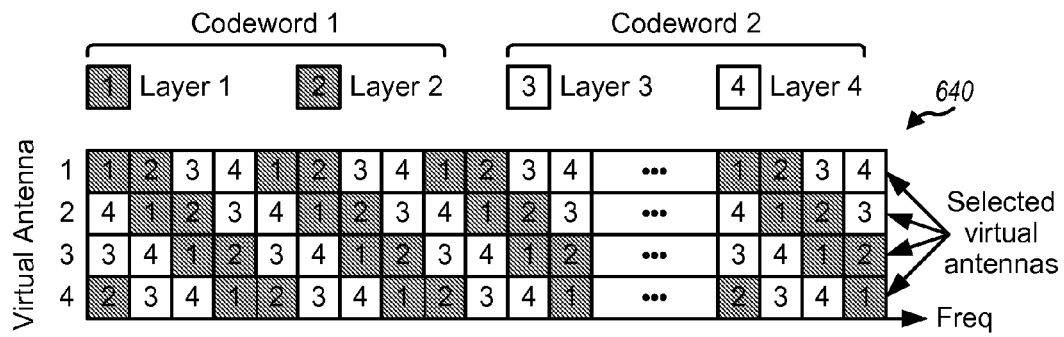

FIG. 6E shows a transmission 640 of two codewords for rank 4 with symmetric layer permutation. All four available virtual antennas may be selected for use. Four layers are available and may be mapped to the four selected virtual antennas with layer permutation. In the example shown in FIG. 6E, the layer permutation is symmetric, and each layer is mapped to all four selected virtual antennas in a cyclic manner. Codeword 1 may be sent on layers 1 and 2, which are shown with shading in FIG. 6E. Codeword 2 may be sent on layers 3 and 4, which are shown without shading in FIG. 6E.

Figure 6F:
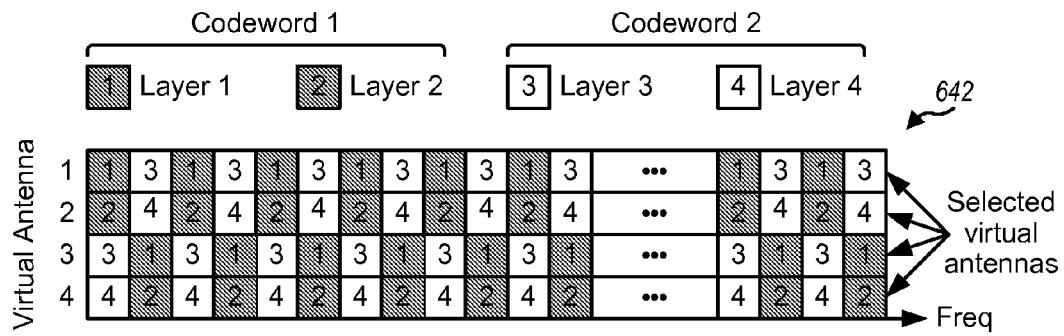

FIG. 6F shows a transmission 642 of two codewords for rank 4 with asymmetric layer permutation. In the example shown in FIG. 6F, layer 1 is mapped to virtual antennas 1 and 3 on alternating subcarriers, layer 2 is mapped to virtual antennas 2 and 4 on alternating subcarriers, layer 3 is mapped to virtual antennas 1 and 3 on alternating subcarriers, and layer 4 is mapped to virtual antennas 2 and 4 on alternating subcarriers. Codeword 1 may be sent on layers 1 and 2, which are shown with shading in FIG. 6F. Codeword 1 may be sent across all four selected virtual antennas even though layers 1 and 2 are each mapped to only two of the four selected virtual antennas. Codeword 2 may be sent on layers 3 and 4, which are shown without shading in FIG. 6F. Codeword 2 may be sent across all four selected virtual antennas even though layers 3 and 4 are each mapped to only two of the four selected virtual antennas.

The asymmetric layer permutation in FIG. 6F may be considered as an example of codeword permutation. In this example, a first antenna group includes virtual antenna 1 and 2, and a second antenna group includes virtual antennas 3 and 4. Codeword 1 is mapped to the first and second antenna groups on alternating subcarriers, and codeword 2 is likewise mapped to the second and first antenna groups on alternating subcarriers.

FIGS. 6B through 6F show some examples of symmetric and asymmetric layer permutation for two, three and four selected virtual antennas. In general, a layer may be mapped symmetrically to all selected virtual antennas or asymmetrically to all or a subset of the selected virtual antennas. The layer permutation may be such that each codeword is mapped uniformly to all selected virtual antennas regardless of how each layer used for that codeword might be mapped.

The mapping of codewords to virtual antennas may be performed as follows:

1. Map L codewords to M layers, e.g., as shown in Table 1,
2. Permute the M layers, e.g., as shown in FIGS. 6B through 6F, and
3. Map the M permuted layers to the M selected virtual antennas, one permuted layer to each selected virtual antenna.

If each codeword is sent across all M selected virtual antennas, then each codeword may observe the average SINR of the M selected virtual antennas with linear MIMO detection. UE 120 may determine a base CQI based on the average SINR. If UE 120 is capable of performing SIC and two codewords are sent with rank 2 or higher, then UE 120 may determine a delta CQI based on the difference between the SINR of the later recovered codeword and the average SINR. The delta CQI may also be referred to as a SIC gain and may be 0 dB or greater. If UE 120 is not capable of performing SIC, then the average SINR would be applicable for all codewords sent to the UE. UE 120 may send the base CQI and the delta CQI (if applicable) to Node B 110. Node B 110 may process (e.g., encode and modulate) the first codeword based on the base CQI and may process the second codeword based on the base CQI and the delta CQI (if applicable).

With layer permutation, the delta CQI may be applicable for a SIC-capable UE that supports SIC but may not be applicable for a SIC-incapable UE that does not support SIC. CQI information may be sent in various manners by the SIC-capable and SIC-incapable UEs.

Figure 7A:
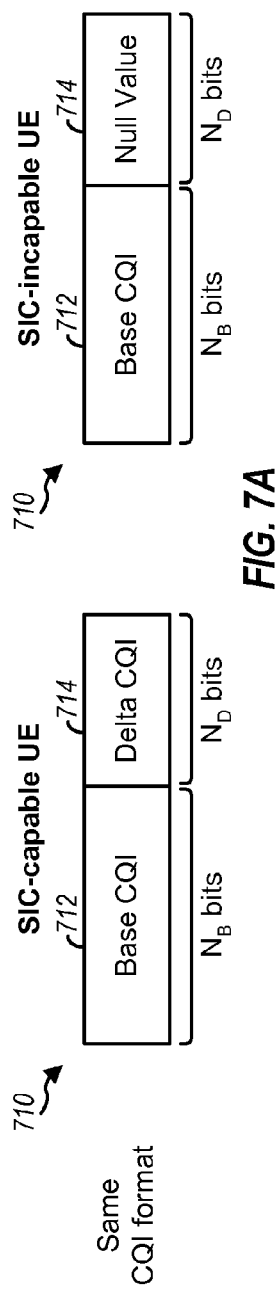
FIGS. 7A to 7C show different CQI reporting schemes.

FIG. 7A shows a CQI reporting scheme for SIC-capable and SIC-incapable UEs. In this scheme, the same CQI format 710 is used for both types of UEs and includes a base CQI field 712 and a delta CQI field 714. Field 712 can carry a full CQI value and may have a length of $N_B$ bits, where $N_B$ may be equal to 4, 5, 6 or some other value. Field 714 can carry a delta CQI value and may have a length of $N_D$ bits, where $N_D$ may be equal to 2, 3, 4 or some other value. A SIC-capable UE may send a base CQI in field 712 and a delta CQI in field 714. A SIC-incapable UE may send a base CQI in field 712 and a null value (e.g., 0 dB) in field 714.

Figure 7B:
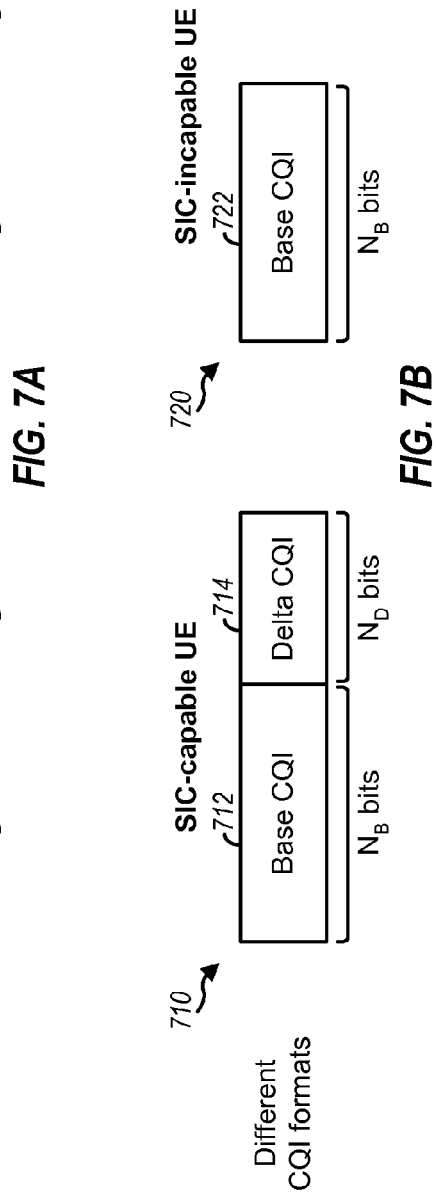

FIG. 7B shows another CQI reporting scheme for SIC-capable and SIC-incapable UEs. In this scheme, different CQI formats 710 and 720 are used for the two types of UEs. CQI format 710 includes base CQI field 712 and delta CQI field 714 whereas CQI format 720 includes only a base CQI field 722. A SIC-capable UE may send a base CQI in field 712 and a delta CQI in field 714 of CQI format 710. A SIC-incapable UE may send a base CQI in field 722 of CQI format 720. A UE may report its capability at the start of a call, e.g., as a parameter during call setup or based on UE identification. The UE may be instructed to use either CQI format 710 or 720 based on its capability.

Figure 7C:
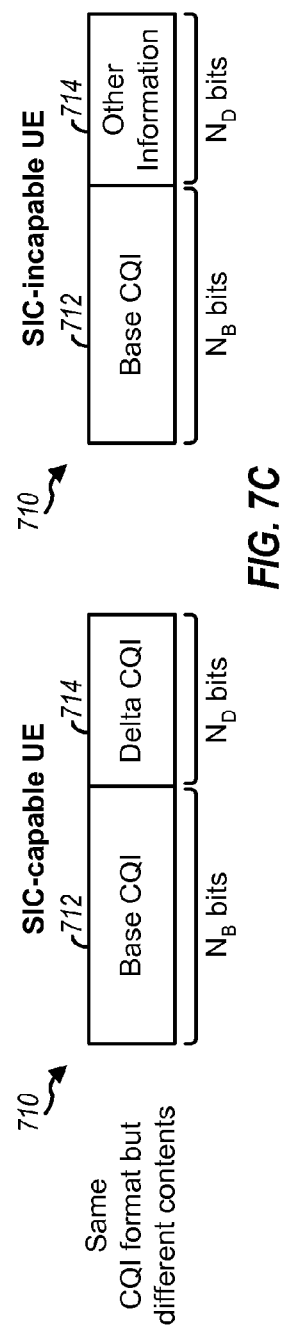

FIG. 7C shows another CQI reporting scheme for SIC-capable and SIC-incapable UEs. In this scheme, the same CQI format 710 is used for both types of UEs but carries different contents for SIC-capable and SIC-incapable UEs. A SIC-capable UE may send a base CQI in field 712 and a delta CQI in field 714. A SIC-incapable UE may send a base CQI in field 712 and other information in field 714. The SIC-capable and SIC-incapable UEs may both be able to more fully utilize the available bits in CQI format 710. A UE may report its capability at the start of a call. The UE may be instructed to send either (i) the base CQI and the delta CQI, if the UE is SIC-capable, or (ii) the base CQI and other information, if the UE is SIC-incapable.

In one design, the other information sent in field 714 comprises a precoding matrix selected from a set of precoding matrices. In this design, a SIC-capable UE may operate with a single precoding matrix (e.g., a DFT matrix) and may not need to send back information for the selected precoding matrix. A SIC-incapable UE may operate with a set of precoding matrices and may be able to select and send back the precoding matrix that provides the best performance. For example, if $N_D=3$, then the SIC-incapable UE may select one of eight possible precoding matrices and send back the selected precoding matrix using three bits. In another design, a SIC-capable UE may operate with a small set of precoding matrices, a SIC-incapable UE may operate with a larger set of precoding matrices, and additional precoding information for the larger set may be sent in field 714. In general, field 714 may be used to send precoding information (e.g., for a precoding matrix, precoding vectors, etc.), SINR information (e.g., average SINR, differential SINR, etc.), and/or other information. A SIC-capable UE may also send other information in field 714 (e.g., any of the information that might be sent by a SIC-incapable UE) when rank 1 is selected and the delta CQI is not applicable.

For a SIC-capable UE, the base CQI may be considered as a spatial channel averaging parameter, and the delta CQI may be considered as a SIC gain parameter. The layer permutation essentially transforms L separate channel-dependent CQIs for the L codewords into the spatial channel averaging parameter and the SIC gain parameter having similar total capacity. The spatial channel averaging parameter and the SIC gain parameter may vary more slowly in time and frequency than the separate channel-dependent CQIs. Furthermore, the SIC gain parameter may vary in a narrow range whereas the gaps between the separate channel-dependent CQIs may vary in a wide range. These factors may enable reduction in spatial feedback and potentially reduction in time and frequency feedback.

The use of layer permutation with base and delta CQI feedback may provide various advantages including:

1. Reduced feedback overhead—the base and delta CQIs may be sent with fewer bits and possibly less frequently than a full CQI for each codeword without layer permutation, and
2. Improved performance due to increased spatial diversity per layer when the CQIs start to be stale or are received in error, or when the scheduled bandwidth is different from the bandwidth over which the CQIs are estimated, etc.

Various computer simulations were performed for 2×2 and 4×4 MIMO transmissions with and without layer permutation for different operating scenarios, e.g., different channel models, different CQI formats, different CQI reporting delays, different scheduled bandwidths versus CQI reporting bandwidth, etc. The computer simulations show layer permutation outperforming no layer permutation for the same feedback overhead, e.g., 5-bit base CQI and 2-bit delta CQI. The performance improvement is greater when the channel Doppler is moderate or high and when the scheduled bandwidth is not equal to the CQI reporting bandwidth, both of which may often be the case in practical MIMO operation.

Figure 8:
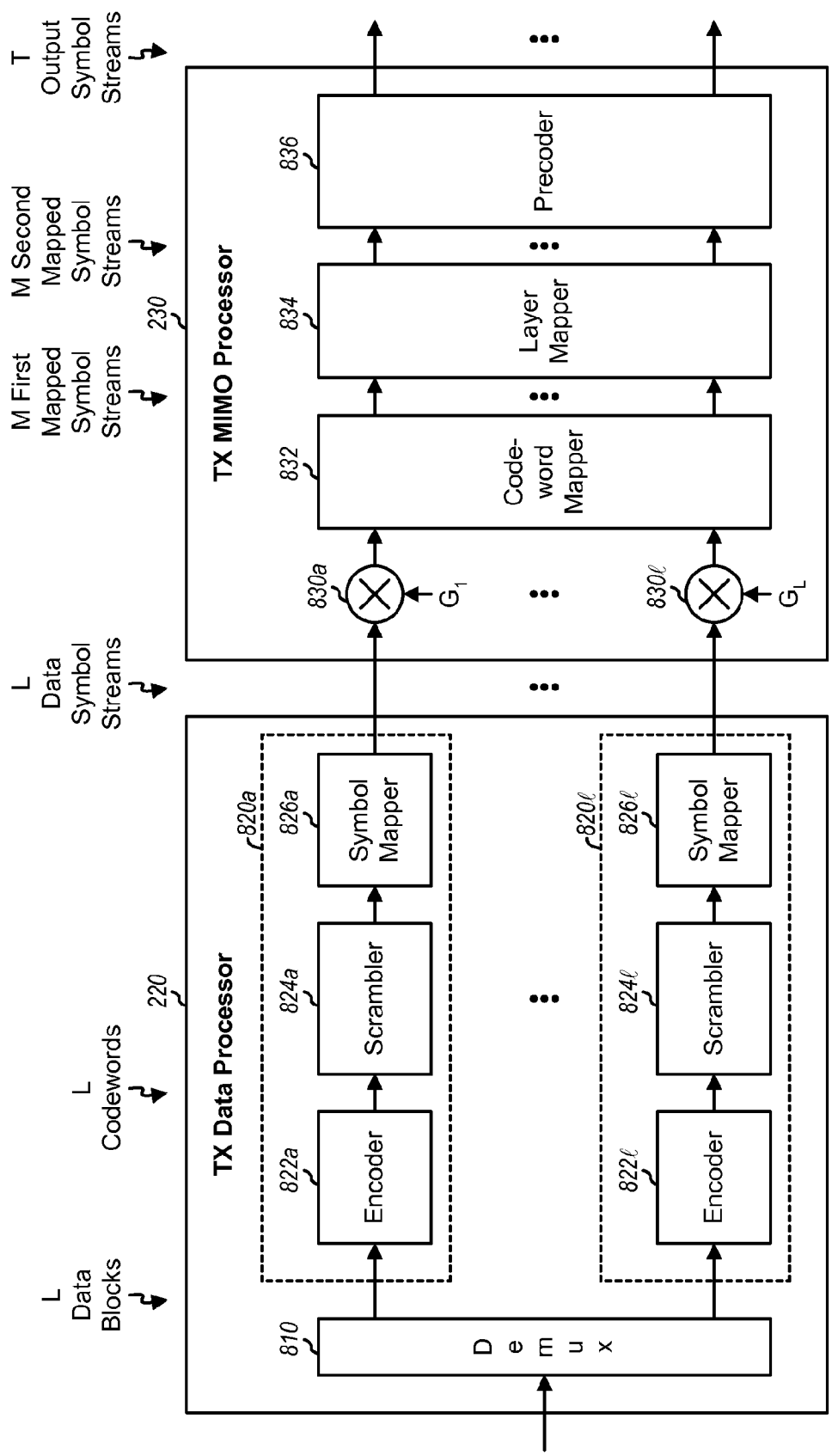
FIG. 8 shows a transmit (TX) data processor and a TX MIMO processor.

FIG. 8 shows a block diagram of a design of TX data processor 220 and TX MIMO processor 230 at Node B 110 in FIG. 2. Within TX data processor 220, a demultiplexer (Demux) 810 may receive data from data source 212, demultiplex the data into L data blocks to be sent in parallel, and provide the L data blocks to L processing sections 820a through 820l, where L≥1.

Within processing section 820a, an encoder 822a may encode its data block in accordance with a coding scheme and provide codeword 1. The coding scheme may include a convolutional code, a Turbo code, a low density parity check (LDPC) code, a cyclic redundancy check (CRC) code, a block code, etc., or a combination thereof. Encoder 822a may also perform puncturing or repetition, as appropriate, to obtain the desired number of code bits. A scrambler 824a may scramble the code bits from encoder 822a based on a scrambling code for codeword 1. A symbol mapper 826a may map the scrambled bits from scrambler 824a based on a modulation scheme and provide data symbols.

Each remaining processing section 820 within TX data processor 220 may similarly process its data block and provide data symbols for one codeword. Each processing section 820 may perform encoding and modulation based on an MCS selected for its codeword. In general, an MCS may indicate a coding scheme or code rate, a modulation scheme, a packet size, a data rate, and/or other parameters.

Within TX MIMO processor 230, multipliers 830a through 830l may receive the data symbols from processing sections 820a through 820l, respectively, for the L codewords. Each multiplier 830 may scale its data symbols with a gain G selected to achieve the desired transmit power for its codeword. A codeword mapper 832 may map the data symbols for the L codewords to M layers, e.g., as shown in FIGS. 6A through 6F. A layer mapper 834 may map the data symbols for the M layers and pilot symbols to subcarriers and virtual antennas used for transmission, e.g., as shown in FIGS. 6A through 6F. Codeword mapper 832 and layer mapper 834 may also be combined into one mapper. A precoder 836 may multiply the mapped symbols for each subcarrier with the precoding matrix $\overline{U}$ and provide output symbols for all subcarriers. Precoder $\overline{836}$ may provide T output symbol streams to T modulators 232a through 232t.

Figure 9:
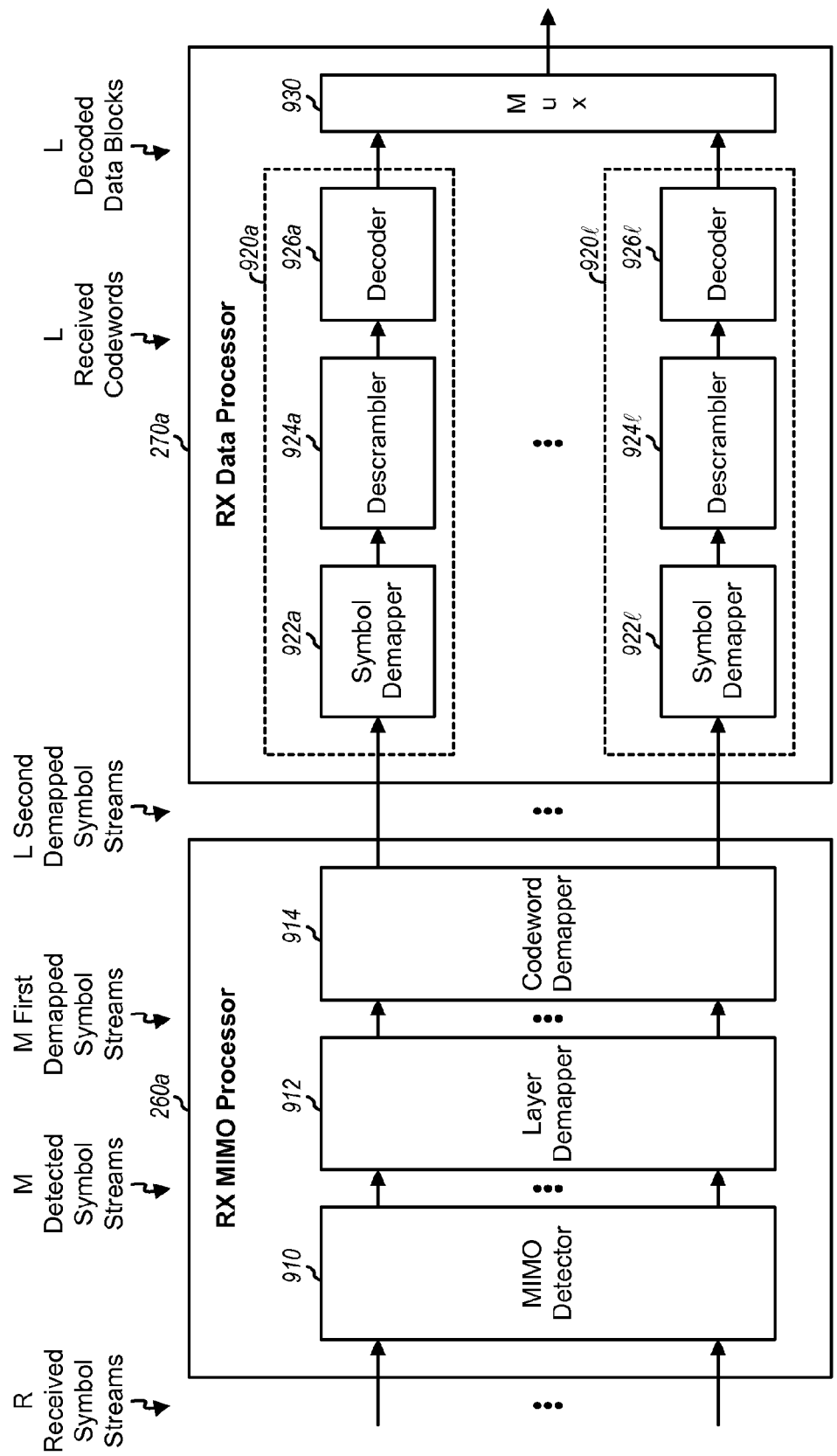
FIG. 9 shows a receive (RX) MIMO processor and an RX data processor.

FIG. 9 shows a block diagram of an RX MIMO processor 260a and an RX data processor 270a, which are one design of RX MIMO processor 260 and RX data processor 270 at UE 120 in FIG. 2. Within RX MIMO processor 260a, a MIMO detector 910 may obtain R received symbol streams from R demodulators 254a through 254r. MIMO detector 910 may perform MIMO detection on the R received symbol streams based on MMSE, zero-forcing, MRC, or some other technique. MIMO detector 910 may provide M detected symbol streams for the M selected virtual antennas. A layer demapper 912 may receive the M detected symbol streams, perform demapping in a manner complementary to the mapping performed by layer mapper 834 in FIG. 8, and provide M demapped symbol streams for the M layers. A codeword demapper 914 may demap the M demapped symbol streams for the M layers and provide M demapped symbol streams for the L codewords. Layer demapper 912 and codeword demapper 914 may also be combined into one demapper.

In the design shown in FIG. 9, RX data processor 270a includes L processing sections 920a through 920l for the L codewords. Each processing section 920 may receive and process one demapped symbol stream for one codeword and provide a corresponding decoded data block. Within processing section 920a for codeword 1, a symbol demapper 922a may perform symbol demapping on its demapped symbol stream, e.g., by computing log-likelihood ratios (LLRs) for the transmitted code bits for codeword 1 based on the demapped symbols and the modulation scheme used for codeword 1. A descrambler 924a may descramble the LLRs from symbol demapper 922a based on the scrambling code for codeword 1. A decoder 926a may decode the descrambled LLRs and provide a decoded data block for codeword 1.

Each remaining processing section 920 within RX data processor 270a may similarly process its demapped symbol stream and provide a corresponding decoded data block. Processing sections 920a through 920l may provide L decoded data blocks for the L codewords. A multiplexer (Mux) 930 may multiplex the L decoded data blocks and provide decoded data.

Figure 10:
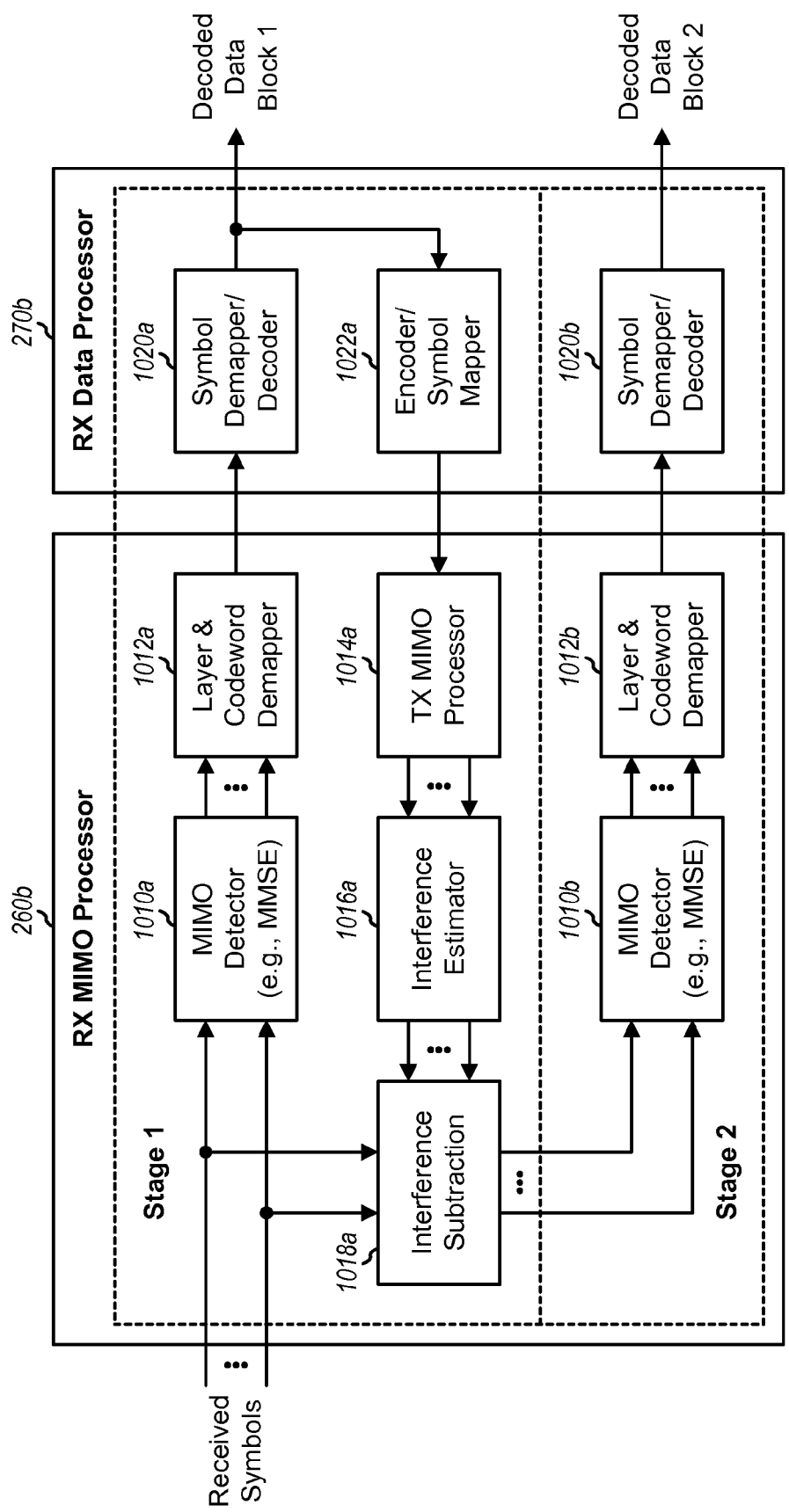
FIG. 10 shows another RX MIMO processor and RX data processor.

FIG. 10 shows a block diagram of an RX MIMO processor 260b and an RX data processor 270b, which are another design of RX MIMO processor 260 and RX data processor 270 at UE 120 in FIG. 2. Processors 260b and 270b perform SIC, recover one codeword at a time, and estimate and cancel the interference from each recovered codeword.

Within stage 1 for codeword 1 being recovered first, a MIMO detector 1010a may obtain R received symbol streams from R demodulators 254a through 254r. MIMO detector 1010a may perform MIMO detection on the R received symbol streams (e.g., based on MMSE technique) and provide M detected symbol streams for the M selected virtual antennas. A layer and codeword demapper 1012a may demap the M detected symbol streams and provide one demapped symbol stream for codeword 1. A processing section 1020a may perform symbol demapping, descrambling, and decoding on the demapped symbol stream and provide a decoded data block for codeword 1, as described above for processing section 920a in FIG. 9.

If codeword 1 is decoded correctly, then a processing section 1022a may encode, scramble, and symbol map the decoded data block in the same manner as processing section 820a at Node B 110 in FIG. 8 to regenerate the data symbols for codeword 1. A TX MIMO processor 1014a may perform spatial processing on the data symbols for codeword 1 in the same manner as TX MIMO processor 230 in FIG. 8. An interference estimator 1016a may estimate the interference due to codeword 1 based on the mapped data symbols from TX MIMO processor 1014a and the channel estimates. An interference subtraction unit 1018a may subtract the estimated interference from the R received symbol streams and provide R input symbol streams for the next stage.

Within stage 2 for codeword 2 being recovered second, a MIMO detector 1010b may obtain the R input symbol streams from unit 1018a in stage 1, perform MIMO detection on the R input symbol streams (e.g., based on MMSE technique), and provide M detected symbol streams for the M selected virtual antennas. A layer and codeword demapper 1012b may demap the M detected symbol streams and provide one demapped symbol stream for codeword 2. A processing section 1020b may perform symbol demapping, descrambling, and decoding on the demapped symbol stream and provide a decoded data block for codeword 2.

If more than two codewords are sent in parallel, then each stage after stage 1 may receive the R input symbol streams from a preceding stage, process the input symbol streams in similar manner as stage 1, and provide a decoded data block for the codeword being recovered by that stage. If the codeword is decoded correctly, then the interference due to the codeword may be estimated and subtracted from the R input symbol streams for that stage to obtain R input symbol streams for the next stage. The last stage may omit the interference estimation and cancellation.

Figure 11:
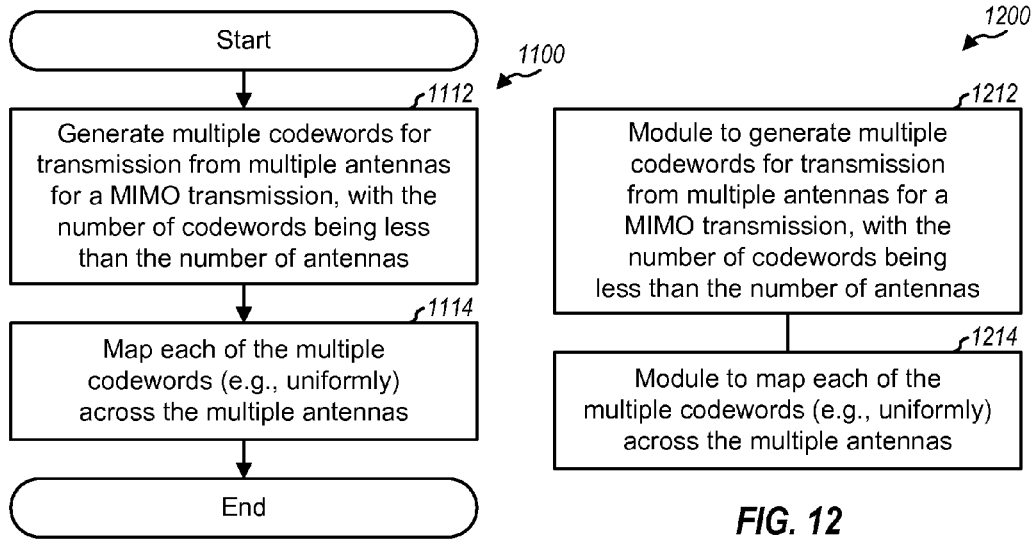
FIG. 11 shows a process for sending a MIMO transmission.

FIG. 11 shows a design of a process 1100 for sending a MIMO transmission. Process 1100 may be performed by a Node B, a UE, or some other transmitter station. Multiple codewords may be generated for transmission from multiple antennas for a MIMO transmission, with the number of codewords being less than the number of antennas (block 1112). In general, an antenna may correspond to a virtual antenna formed based on a precoding matrix, a physical antenna, etc. The multiple antennas may be selected from a plurality of available antennas. Each of the multiple codewords may be mapped across the multiple antennas (block 1114). Each codeword may be mapped uniformly across the multiple antennas such that an equal portion of the codeword is mapped to each of the multiple antennas. For example, each codeword may be mapped cyclically across the multiple antennas on multiple subcarriers, e.g., as shown in FIG. 6C or 6E.

In one design, two codewords comprising first and second codewords may be generated. For rank 3, the first codeword may be mapped across three antennas and to one antenna on each subcarrier. The second codeword may be mapped across the three antennas and to two antennas on each subcarrier. For rank 4, each codeword may be mapped across four antennas and to two antennas on each subcarrier.

In one design, each codeword may be mapped to at least one of multiple layers. The multiple layers may then be mapped to multiple virtual antennas, e.g., by mapping each layer cyclically across the multiple virtual antennas on multiple subcarriers. Two codewords comprising first and second codewords may be generated. For rank 3, the first codeword may be mapped to one of three layers, the second codeword may be mapped to the remaining two of the three layers, and the three layers may be mapped to three virtual antennas. For rank 4, each codeword may be mapped to two of four layers, and the four layers may be mapped to four virtual antennas.

Figure 12:
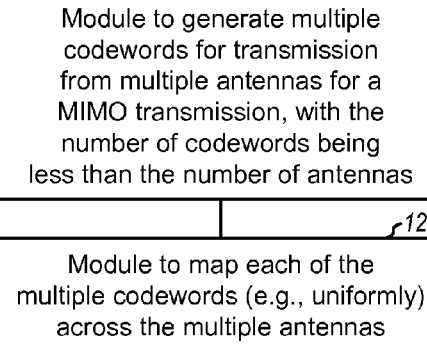
FIG. 12 shows an apparatus for sending a MIMO transmission.

FIG. 12 shows a design of an apparatus 1200 for sending a MIMO transmission. Apparatus 1200 includes means for generating multiple codewords for transmission from multiple antennas for a MIMO transmission, with the number of codewords being less than the number of antennas (module 1212), and means for mapping each of the multiple codewords across the multiple antennas (module 1214).

Figure 13:
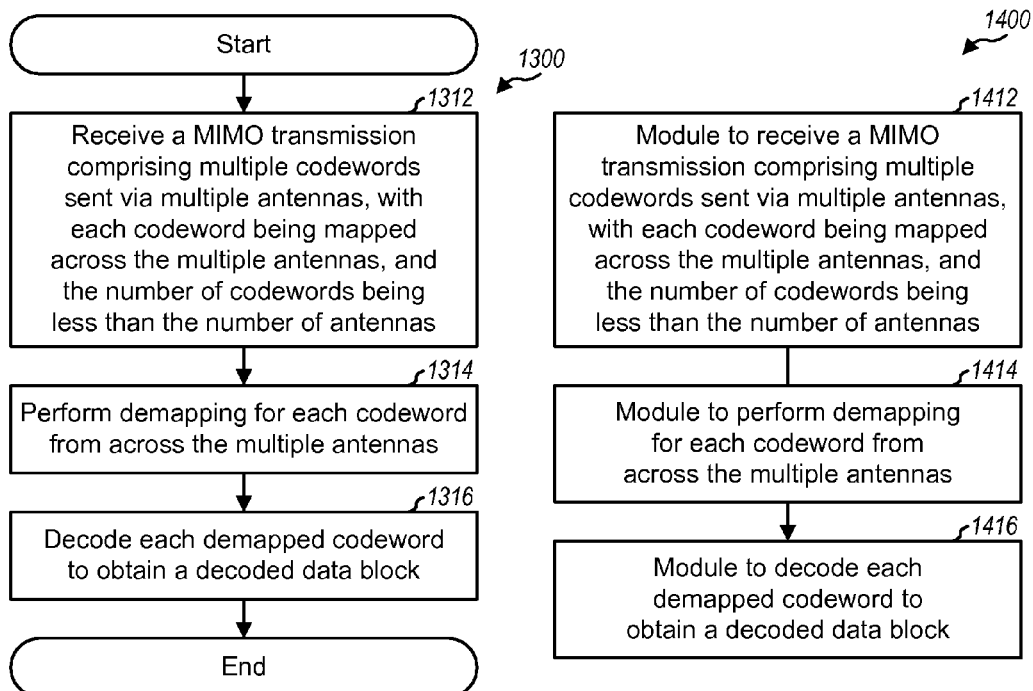
FIG. 13 shows a process for receiving a MIMO transmission.

FIG. 13 shows a design of a process 1300 for receiving a MIMO transmission. Process 1300 may be performed by a UE, a Node B, or some other receiver station. A MIMO transmission comprising multiple codewords sent via multiple antennas may be received, with each codeword being mapped across the multiple antennas, and with the number of codewords being less than the number of antennas (block 1312). Demapping may be performed for each codeword from across the multiple antennas (block 1314). Each demapped codeword may be decoded to obtain a corresponding decoded data block (block 1316).

In one design, the MIMO transmission may comprise first and second codewords. For rank 3, demapping may be performed for (i) the first codeword from across three virtual antennas and from one virtual antenna on each of multiple subcarriers and (ii) the second codeword from across the three virtual antennas and from two virtual antennas on each subcarrier. For rank 4, demapping may be performed for each codeword from across four virtual antennas and from two virtual antennas on each subcarrier.

MIMO detection may be performed on multiple received symbol streams to obtain multiple detected symbol streams for the multiple antennas. In one design, the multiple detected symbol streams may be demapped to obtain multiple demapped symbol streams for the multiple codewords. Each demapped symbol stream may then be decoded to obtain a decoded data block for one codeword. In another design, the multiple detected symbol streams may be demapped to obtain multiple first demapped symbol streams for multiple layers. The multiple first demapped symbol streams may further be demapped to obtain multiple second demapped symbol streams for the multiple codewords. Each second demapped symbol stream may then be decoded to obtain a decoded data block for one codeword.

Figure 14:
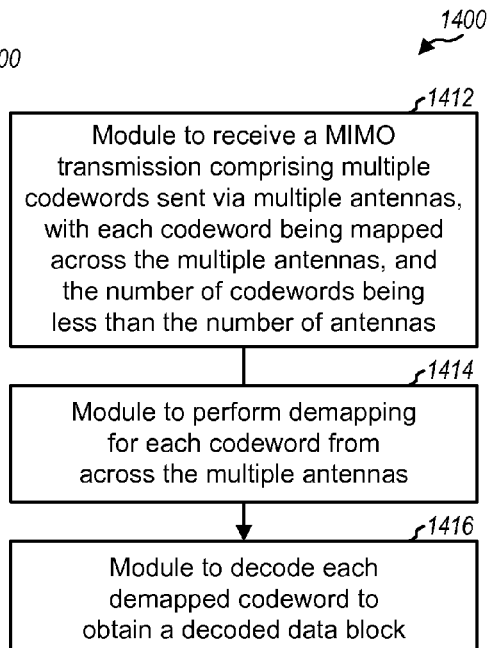
FIG. 14 shows an apparatus for receiving a MIMO transmission.

FIG. 14 shows a design of an apparatus 1400 for receiving a MIMO transmission. Apparatus 1400 includes means for receiving a MIMO transmission comprising multiple codewords sent via multiple antennas, with each codeword being mapped across the multiple antennas, and with the number of codewords being less than the number of antennas (module 1412), means for performing demapping for each codeword from across the multiple antennas (module 1414), and means for decoding each demapped codeword to obtain a corresponding decoded data block (module 1416).

Figure 15:
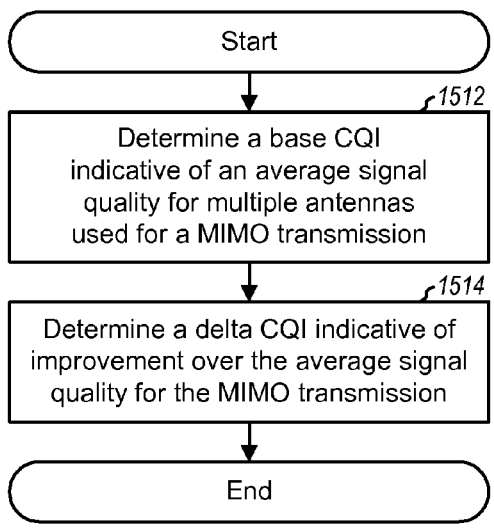
FIG. 15 shows a process for determining CQI.

FIG. 15 shows a design of a process 1500 for determining CQI. Process 1500 may be performed by a UE, a Node B, etc. A base CQI indicative of an average signal quality for multiple antennas used for a MIMO transmission may be determined (block 1512). A delta CQI indicative of improvement over the average signal quality for the MIMO transmission may also be determined (block 1514). The base CQI may comprise an SINR value, a modulation and coding scheme, a packet format, a transport format, a rate, etc. The delta CQI may comprise a change to the base CQI.

For a SIC-capable UE, the delta CQI may be determined based on use of SIC for detection of the MIMO transmission. The delta CQI may indicate improvement in signal quality for a second codeword after cancellation of interference from a first codeword. The delta CQI may be set to a null value if the MIMO transmission has rank 1. For a SIC-incapable UE, and also for a SIC-capable UE when rank is 1, the delta CQI may be set to a null value if SIC is not used for detection of the MIMO transmission or if the rank is 1. Precoding and/or other information may also be sent using the bits normally used for the delta CQI and may indicate a precoding matrix selected from among multiple precoding matrices and/or other information.

In one design, the MIMO transmission may comprise first and second codewords. For rank 3, the base CQI may be determined based on the average signal quality for three virtual antennas. For rank 4, the base CQI may be determined based on the average signal quality for four virtual antennas. For both ranks 3 and 4, the delta CQI may be determined based on improvement in signal quality for the second codeword after cancellation of interference from the first codeword.

Figure 16:
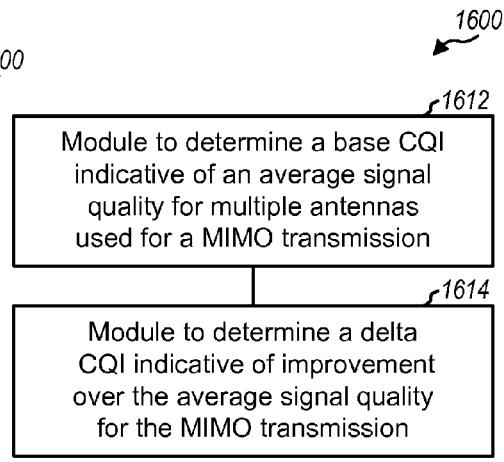
FIG. 16 shows an apparatus for determining CQI.

FIG. 16 shows a design of an apparatus 1600 for determining CQI. Apparatus 1600 includes means for determining a base CQI indicative of an average signal quality for multiple antennas used for a MIMO transmission (module 1612), and means for determining a delta CQI indicative of improvement over the average signal quality for the MIMO transmission (module 1614).

Figure 17:
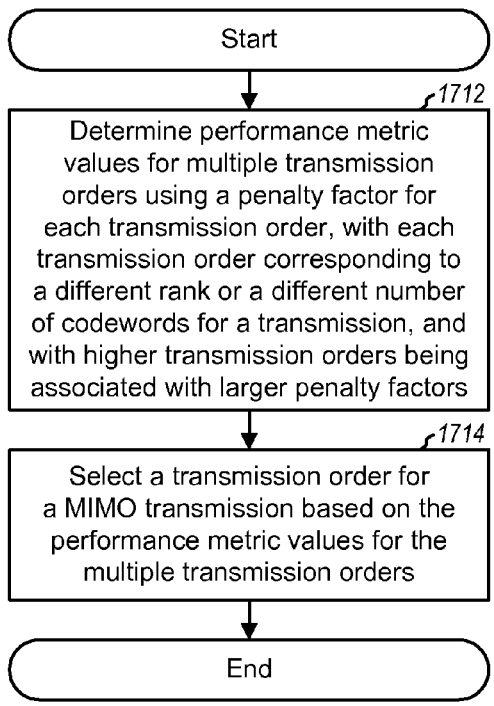
FIG. 17 shows a process for performing rank selection.

FIG. 17 shows a design of a process 1700 for performing rank/codeword selection. Process 1700 may be performed by a UE, a Node B, etc. Performance metric values for multiple transmission orders may be determined using a penalty factor for each transmission order, with each transmission order corresponding to a different rank or a different number of codewords for a transmission, and with higher transmission orders being associated with larger penalty factors (block 1712). A transmission order for a MIMO transmission may be selected based on the performance metric values for the multiple transmission orders (block 1714).

In one design, each transmission order may correspond to a different rank. In this case, performance metric values may be determined for multiple hypotheses for the multiple ranks, with each hypothesis corresponding to a different set of at least one antenna, e.g., as shown in FIG. 3. The rank and the set of at least one antenna corresponding to the hypothesis with the largest performance metric value may be selected for the MIMO transmission. The performance metric value for each hypothesis may relate to total capacity or some other metric for the set of at least one antenna for that hypothesis.

In one design, a performance metric value may be determined for each of multiple first hypotheses for rank 1 using a first penalty factor. Each first hypothesis may correspond to a different antenna among multiple antennas. The first penalty factor may be zero or non-zero. A performance metric value may be determined for each of multiple second hypotheses for rank 2 using a second penalty factor. Each second hypothesis may correspond to a different pair of antennas. The second penalty factor may be equal to or larger than the first penalty factor. A performance metric value may be determined for each of multiple third hypotheses for rank 3 using a third penalty factor. Each third hypothesis may correspond to a different set of three antennas. The third penalty factor may be equal to or larger than the second penalty factor. A performance metric value may be determined for a fourth hypothesis for rank 4 using a fourth penalty factor. The fourth hypothesis may correspond to a set of four antennas. The fourth penalty factor may be equal to or larger than the third penalty factor. For the design shown in Table 1, one codeword is sent for rank 1 and two codewords are sent for rank 2, 3 or 4. The second, third and fourth penalty factors for ranks 2, 3 and 4 may be equal to each other and may be larger than the first penalty factor for rank 1. In this case, the rank selection is essentially performed with different penalty factors for different numbers of codewords. In general, when each transmission order corresponds to a different rank, any number of codewords may be sent for each rank.

In another design, each transmission order may correspond to a different number of codewords. In this case, performance metric values may be determined for different numbers of codewords using any scheme. The number of codewords with the largest performance metric value may be selected for the MIMO transmission. In general, when each transmission order corresponds to a different number of codewords, any rank may be used for data transmission, and the rank to use for data transmission may be determined in any manner.

Figure 18:
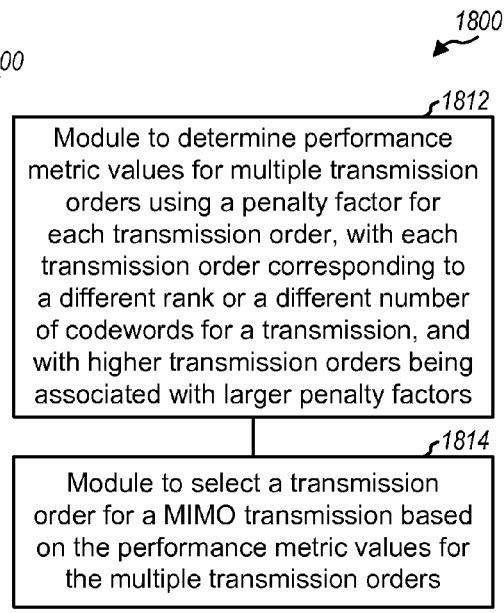
FIG. 18 shows an apparatus for performing rank selection.

FIG. 18 shows a design of an apparatus 1800 for performing rank/codeword selection. Apparatus 1800 includes means for determining performance metric values for multiple transmission orders using a penalty factor for each transmission order, with higher transmission orders being associated with larger penalty factors (module 1812), and means for selecting a transmission order for a MIMO transmission based on the performance metric values for the multiple transmission order (module 1814).

The modules in FIGS. 12, 14, 16 and 18 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
   at least one processor configured to:
      generate multiple codewords for transmission from multiple antennas, each of the multiple codewords being independently encoded, with the number of codewords being equal to or less than the number of antennas, and
      map each of the multiple codewords across the multiple antennas, wherein the at least one processor is configured to generate first and second codewords, to map the first codeword across at least three antennas and to one antenna on each of multiple subcarriers, and to map the second codeword across the at least three antennas and to two antennas on each of the multiple subcarriers; and
   a memory coupled to the at least one processor.

2. The apparatus of claim 1, wherein the at least one processor is configured to map each codeword uniformly across the multiple antennas such that an equal portion of the codeword is mapped to each of the multiple antennas.

3. The apparatus of claim 1, wherein the at least one processor is configured to map each codeword cyclically across the multiple antennas on multiple subcarriers.

4. The apparatus of claim 1, wherein the multiple antennas correspond to multiple virtual antennas formed based on a precoding matrix.

5. The apparatus of claim 4, wherein the multiple virtual antennas are selected from a plurality of available virtual antennas formed based on the precoding matrix.

6. The apparatus of claim 1, wherein the at least one processor is configured to map each of the multiple codewords to at least one of multiple layers, and to map the multiple layers to the multiple antennas.

7. The apparatus of claim 6, wherein the at least one processor is configured to map each layer to at least one of multiple virtual antennas formed based on a precoding matrix.

8. The apparatus of claim 6, wherein the at least one processor is configured to partition each codeword mapped to at least two layers such that an equal portion of the codeword is mapped to each of the at least two layers.

9. The apparatus of claim 1, wherein the at least one processor is configured to generate two codewords comprising first and second codewords, to map the first codeword to one of three layers, to map the second codeword to remaining two of three layers, and to map the three layers to the three virtual antennas formed based on a precoding matrix.

10. The apparatus of claim 9, wherein the second codeword is twice the size of the first codeword.

11. The apparatus of claim 1, wherein the at least one processor is configured to generate two codewords comprising first and second codewords, to map the first codeword to two of four layers, to map the second codeword to remaining two of the four layers, and to map the four layers to four virtual antennas formed based on a precoding matrix.

12. The apparatus of claim 1, wherein the multiple antennas correspond to multiple physical antennas.

13. The apparatus of claim 1, wherein the at least one processor is configured to generate two codewords comprising first and second codewords, to map the first codeword to a first layer, to map the second codeword to a second layer, and to map the first and second layers to two virtual antennas formed based on a precoding matrix.

14. An apparatus for wireless communication, comprising:
    at least one processor configured to:
       generate multiple codewords for transmission from multiple antennas, each of the multiple codewords being independently encoded, with the number of codewords being equal to or less than the number of antennas, and
       map each of the multiple codewords across the multiple antennas, wherein the at least one processor is configured to generate first and second codewords, to map the first codeword across four antennas and to two antennas on each of multiple subcarriers, and to map the second codeword across the four antennas and to two antennas on each of the multiple subcarriers; and
    a memory coupled to the at least one processor.

15. A method for wireless communication, comprising:
    generating multiple codewords for transmission from multiple antennas, each of the multiple codewords being independently encoded, with the number of codewords being equal to or less than the number of antennas; and
    mapping each of the multiple codewords across the multiple antennas, wherein the multiple codewords comprise first and second codewords, and wherein the mapping each of the multiple codewords comprises
       mapping the first codeword across at least three antennas and to one antenna on each of multiple subcarriers, and
       mapping the second codeword across the at least three antennas and to two antennas on each of the multiple subcarriers.

16. The method of claim 15, wherein the mapping each of the multiple codewords comprises mapping each codeword cyclically across the multiple antennas on multiple subcarriers.

17. The method of claim 15, wherein the multiple codewords comprise first and second codewords, and wherein the mapping each of the multiple codewords comprises
    mapping the first codeword to one of three layers,
    mapping the second codeword to remaining two of the three layers, and
    mapping the three layers to three virtual antennas formed based on a precoding matrix.

18. The method of claim 17, wherein the second codeword is twice the size of the first codeword.

19. The method of claim 15, wherein the multiple codewords comprise first and second codewords, and wherein the mapping each of the multiple codewords comprises
    mapping the first codeword to two of four layers,
    mapping the second codeword to remaining two of the four layers, and mapping the four layers to four virtual antennas formed based on a precoding matrix.

20. The method of claim 15, wherein the multiple antennas correspond to multiple physical antennas.

21. The method of claim 15, wherein the mapping each of the multiple codewords comprises
mapping each of the multiple codewords to at least one of multiple layers, and
mapping the multiple layers to the multiple antennas.

22. The method of claim 21, further comprising:
partitioning each codeword mapped to at least two layers such that an equal portion of the codeword is mapped to each of the at least two layers.

23. The method of claim 15, wherein the mapping each of the multiple codewords comprises
mapping each of the multiple codewords to at least one of multiple layers, and
mapping each of the multiple layers to at least one of multiple virtual antennas formed based on a precoding matrix.

24. The method of claim 15, wherein the multiple codewords comprise first and second codewords, and wherein the mapping each of the multiple codewords comprises
mapping the first codeword to a first layer,
mapping the second codeword to a second layer, and
mapping the first and second layers to two virtual antennas formed based on a precoding matrix.

25. A method for wireless communication, comprising:
generating multiple codewords for transmission from multiple antennas, each of the multiple codewords being independently encoded, with the number of codewords being equal to or less than the number of antennas; and
mapping each of the multiple codewords across the multiple antennas, wherein the multiple codewords comprise first and second codewords, and wherein the mapping each of the multiple codewords comprises
mapping the first codeword across four antennas and to two antennas on each of multiple subcarriers, and
mapping the second codeword across the four antennas and to two antennas on each of the multiple subcarriers.

26. An apparatus for wireless communication, comprising:
means for generating multiple codewords for transmission from multiple antennas, each of the multiple codewords being independently encoded, with the number of codewords being equal to or less than the number of antennas; and
means for mapping each of the multiple codewords across the multiple antennas, wherein the multiple codewords comprise first and second codewords, and wherein the means for mapping each of the multiple codewords comprises
means for mapping the first codeword across at least three antennas and to one antenna on each of multiple subcarriers, and
means for mapping the second codeword across the at least three antennas and to two antennas on each of the multiple subcarriers.

27. The apparatus of claim 26, wherein the means for mapping each of the multiple codewords comprises means for mapping each codeword cyclically across the multiple antennas on multiple subcarriers.

28. The apparatus of claim 26, wherein the multiple codewords comprise first and second codewords, and wherein the means for mapping each of the multiple codewords comprises
means for mapping the first codeword to one of three layers,
means for mapping the second codeword to remaining two of the three layers, and
means for mapping the three layers to three virtual antennas formed based on a precoding matrix.

29. The apparatus of claim 26, wherein the multiple codewords comprise first and second codewords, and wherein the means for mapping each of the multiple codewords comprises
means for mapping the first codeword to two of four layers,
means for mapping the second codeword to remaining two of the four layers, and
means for mapping the four layers to four virtual antennas formed based on a precoding matrix.

30. An apparatus for wireless communication, comprising:
means for generating multiple codewords for transmission from multiple antennas, each of the multiple codewords being independently encoded, with the number of codewords being equal to or less than the number of antennas; and
means for mapping each of the multiple codewords across the multiple antennas, wherein the multiple codewords comprise first and second codewords, and wherein the means for mapping each of the multiple codewords comprises
means for mapping the first codeword across four antennas and to two antennas on each of multiple subcarriers, and
means for mapping the second codeword across the four antennas and to two antennas on each of the multiple subcarriers.

31. A non-transitory machine-readable medium comprising instructions which, when executed by a machine, cause the machine to perform operations including:
generating multiple codewords for transmission from multiple antennas, each of the multiple codewords being independently encoded, with the number of codewords being equal to or less than the number of antennas; and
mapping each of the multiple codewords across the multiple antennas, wherein the multiple codewords comprise first and second codewords, and wherein the mapping each of the multiple codewords comprises
mapping the first codeword across at least three antennas and to one antenna on each of multiple subcarriers, and
mapping the second codeword across the at least three antennas and to two antennas on each of the multiple subcarriers.

32. An apparatus for wireless communication, comprising:
at least one processor configured to:
receive a multiple-input multiple-output (MIMO) transmission comprising multiple codewords sent via multiple antennas, each of the multiple codewords being independently encoded and mapped across the multiple antennas, and the number of codewords being equal to or less than the number of antennas,
perform demapping for each codeword from across the multiple antennas, wherein the MIMO transmission comprises first and second codewords sent via at least three virtual antennas formed based on a precoding matrix, and wherein the at least one processor is configured to perform demapping for the first codeword from one virtual antenna on each of multiple subcarriers, and to perform demapping for the second codeword from two virtual antennas on each of the multiple subcarriers, and
decode each demapped codeword; and
a memory coupled to the at least one processor.

33. The apparatus of claim 32, wherein the MIMO transmission comprises two codewords sent via four virtual antennas formed based on a precoding matrix, and wherein the at least one processor is configured to perform demapping for each codeword from two virtual antennas on each of multiple subcarriers.

34. The apparatus of claim 32, wherein the at least one processor is configured to:
perform MIMO detection on multiple received symbol streams to obtain multiple detected symbol streams for multiple layers,
demap the multiple detected symbol streams to obtain multiple demapped symbol streams for the multiple codewords, and
decode each demapped symbol stream to obtain decoded data for one codeword.

35. The apparatus of claim 32, wherein the at least one processor is configured to:
perform MIMO detection on multiple received symbol streams to obtain multiple detected symbol streams for multiple virtual antennas,
demap the multiple detected symbol streams to obtain multiple first demapped symbol streams for multiple layers,
demap the multiple first demapped symbol streams to obtain multiple second demapped symbol streams for the multiple codewords, and
decode each second demapped symbol stream to obtain decoded data for one codeword.

36. The apparatus of claim 32, wherein the MIMO transmission comprises first and second codewords sent on first and second layers, and wherein the at least one processor is configured to perform demapping for the first codeword from the first layer, and to perform demapping for the second codeword from the second layer.

37. The apparatus of claim 32, wherein the MIMO transmission comprises first and second codewords sent on first, second and third layers, and wherein the at least one processor is configured to perform demapping for the first codeword from the first layer, and to perform demapping for the second codeword from the second and third layers.

38. The apparatus of claim 32, wherein the MIMO transmission comprises first and second codewords sent on first, second, third and fourth layers, and wherein the at least one processor is configured to perform demapping for the first codeword from the first and second layers, and to perform demapping for the second codeword from the third and fourth layers.

39. A method for wireless communication, comprising:
receiving a multiple-input multiple-output (MIMO) transmission comprising multiple codewords sent via multiple antennas, each of the multiple codewords being independently encoded and mapped across the multiple antennas, and the number of codewords being equal to or less than the number of antennas;
performing demapping for each codeword from across the multiple antennas, wherein the MIMO transmission comprises first and second codewords sent via at least three virtual antennas formed based on a precoding matrix, and wherein the performing demapping comprises
performing demapping for the first codeword from one virtual antenna on each of multiple subcarriers, and
performing demapping for the second codeword from two virtual antennas on each of the multiple subcarriers; and
decoding each demapped codeword.

40. The method of claim 39, wherein the MIMO transmission comprises first and second codewords sent via four virtual antennas formed based on a precoding matrix, and wherein the performing demapping comprises performing demapping for each codeword from two virtual antennas on each of multiple subcarriers.

41. The method of claim 39, wherein the MIMO transmission comprises first and second codewords sent on first and second layers, and wherein the performing demapping comprises
performing demapping for the first codeword from the first layer, and
performing demapping for the second codeword from the second layer.

42. The method of claim 39, wherein the MIMO transmission comprises first and second codewords sent on first, second and third layers, and wherein the performing demapping comprises
performing demapping for the first codeword from the first layer, and
performing demapping for the second codeword from the second and third layers.

43. The method of claim 39, wherein the MIMO transmission comprises first and second codewords sent on first, second, third and fourth layers, and wherein the performing demapping comprises
performing demapping for the first codeword from the first and second layers, and
performing demapping for the second codeword from the third and fourth layers.

44. An apparatus for wireless communication, comprising:
means for receiving a multiple-input multiple-output (MIMO) transmission comprising multiple codewords sent via multiple antennas, each of the multiple codewords being independently encoded and mapped across the multiple antennas, and the number of codewords being equal to or less than the number of antennas;
means for performing demapping for each codeword from across the multiple antennas, wherein the MIMO transmission comprises first and second codewords sent via at least three virtual antennas formed based on a precoding matrix, and wherein the means for performing demapping comprises
means for performing demapping for the first codeword from one virtual antenna on each of multiple subcarriers, and
means for performing demapping for the second codeword from two virtual antennas on each of the multiple subcarriers; and
means for decoding each demapped codeword.

45. The apparatus of claim 44, wherein the MIMO transmission comprises first and second codewords sent via four virtual antennas formed based on a precoding matrix, and wherein the means for performing demapping comprises means for performing demapping for each codeword from two virtual antennas on each of multiple subcarriers.

46. The apparatus of claim 44, wherein the MIMO transmission comprises first and second codewords sent on first and second layers, and wherein the means for performing demapping comprises
means for performing demapping for the first codeword from the first layer, and
means for performing demapping for the second codeword from the second layer.

47. The apparatus of claim 44, wherein the MIMO transmission comprises first and second codewords sent on first, second and third layers, and wherein the means for performing demapping comprises
- means for performing demapping for the first codeword from the first layer, and
- means for performing demapping for the second codeword from the second and third layers.

48. The apparatus of claim 44, wherein the MIMO transmission comprises first and second codewords sent on first, second, third and fourth layers, and wherein the means for performing demapping comprises
- means for performing demapping for the first codeword from the first and second layers, and
- means for performing demapping for the second codeword from the third and fourth layers.

49. A non-transitory machine-readable medium comprising instructions which, when executed by a machine, cause the machine to perform operations including:

- receiving a multiple-input multiple-output (MIMO) transmission comprising multiple codewords sent via multiple antennas, each of the multiple codewords being independently encoded and mapped across the multiple antennas, and the number of codewords being equal to or less than the number of antennas;
- performing demapping for each codeword from across the multiple antennas, wherein the MIMO transmission comprises first and second codewords sent via at least three virtual antennas formed based on a precoding matrix, and wherein the performing demapping comprises
  - performing demapping for the first codeword from one virtual antenna on each of multiple subcarriers, and
  - performing demapping for the second codeword from two virtual antennas on each of the multiple subcarriers; and
- decoding each demapped codeword.

* * * * *